(12) United States Patent
Muto et al.

(10) Patent No.: US 8,810,237 B2
(45) Date of Patent: Aug. 19, 2014

(54) RELATIVE ANGLE DETECTION DEVICE, ROTATION ANGLE DETECTION DEVICE, RELATIVE ANGLE DETECTION METHOD, AND ROTATION ANGLE DETECTION METHOD

(75) Inventors: Hiroyuki Muto, Tochigi (JP); Kiyokazu Okado, Tochigi (JP); Tsukasa Suzuki, Tochigi (JP)

(73) Assignee: Showa Corporation, Saitama (JP)

( * ) Notice: Subject to any disclaimer, the term of this patent is extended or adjusted under 35 U.S.C. 154(b) by 193 days.

(21) Appl. No.: 13/512,555

(22) PCT Filed: Jun. 30, 2010

(86) PCT No.: PCT/JP2010/061102
§ 371 (c)(1),
(2), (4) Date: May 29, 2012

(87) PCT Pub. No.: WO2011/080935
PCT Pub. Date: Jul. 7, 2011

(65) Prior Publication Data
US 2012/0256619 A1    Oct. 11, 2012

(30) Foreign Application Priority Data

Dec. 28, 2009    (JP) .................................. 2009-298332

(51) Int. Cl.
*G01B 7/14*    (2006.01)
(52) U.S. Cl.
USPC .............. 324/207.2; 324/207.21; 324/207.22; 324/207.23; 324/207.24; 324/207.25
(58) Field of Classification Search
CPC ........................................................ G01B 7/30
USPC ............................... 324/205, 207.11–207.14, 324/207.2–207.25; 73/862.321, 862.322
See application file for complete search history.

(56) References Cited

U.S. PATENT DOCUMENTS 5,239,490 A * 8/1993 Masaki et al. ................... 702/41
7,174,795 B2 * 2/2007 Feng et al. ............... 73/862.332
(Continued)

FOREIGN PATENT DOCUMENTS

| CN | 1591158 | 3/2005 |
| DE | 40 29 828 C2 | 4/1994 |

(Continued)

*Primary Examiner* — Arleen M Vazquez
*Assistant Examiner* — Alesa Allgood
(74) *Attorney, Agent, or Firm* — Leason Ellis LLP

(57) ABSTRACT

Disclosed is a relative angle detection device for detecting a relative angle between a first rotary shaft and a second rotary shaft, the relative angle detection device being provided with a first magnetic field sensing unit which outputs a value according to a magnetic field of a magnet, a second magnetic field sensing unit which outputs a value according to the magnetic field of the magnet and outputs a value different from the output value of the first magnetic field sensing unit even if being placed in the same magnetic field as that of the first magnetic field sensing unit, a correction unit which corrects one output value out of the output value of the first magnetic field sensing unit and the output value of the second magnetic field sensing unit in accordance with an amplitude ratio between magnetic field components orthogonal to each other in the magnetic field of the magnet, and a computing unit which computes the relative angle between the first rotary shaft and the second rotary shaft on the basis of the one output value corrected by the correction unit and the other output value different from the one output value. Consequently, a technique capable of detecting the relative rotation angle with high accuracy is provided even if magnitudes of amplitudes of magnetic field components orthogonal to each other in the magnetically sensitive surface of the magnetic field sensing unit are different from each other.

14 Claims, 23 Drawing Sheets

(56) References Cited

U.S. PATENT DOCUMENTS

| | | |
|---|---|---|
| 7,219,563 B2 * | 5/2007 | Saito .................... 73/862.331 |
| 7,675,284 B2 * | 3/2010 | Matsumoto et al. ..... 324/207.25 |
| 8,222,895 B2 * | 7/2012 | Asahara et al. .......... 324/207.25 |
| 8,564,283 B2 * | 10/2013 | Mita et al. ................ 324/207.25 |
| 2002/0124663 A1 * | 9/2002 | Tokumoto et al. ....... 73/862.333 |
| 2002/0153875 A1 * | 10/2002 | Maeda ........................ 324/105 |
| 2005/0028614 A1 | 2/2005 | Saito |
| 2005/0036775 A1 * | 2/2005 | Morimoto ..................... 396/67 |
| 2005/0172732 A1 | 8/2005 | Feng et al. |
| 2008/0100285 A1 | 5/2008 | Matsumoto et al. |
| 2009/0206827 A1 | 8/2009 | Aimuta et al. |
| 2009/0211374 A1 * | 8/2009 | Oike et al. ................ 73/862.08 |
| 2010/0321008 A1 | 12/2010 | Mita et al. |

FOREIGN PATENT DOCUMENTS

| | | |
|---|---|---|
| DE | 602 20 739 T2 | 3/2008 |
| EP | 1260 425 B1 | 10/2005 |
| JP | 2000-095122 | 4/2000 |
| JP | 2005-055297 A | 3/2005 |
| JP | 2005-062372 A | 3/2005 |
| JP | 2008-107235 A | 5/2008 |
| JP | 2009-025319 A | 3/2009 |
| JP | 2009-222517 | 10/2009 |
| WO | WO 2007055135 A | 5/2007 |
| WO | WO 2009099054 | 8/2009 |

* cited by examiner

AMOUNT OF CHANGE IN RESISTANCE

ANGLE ($\theta$)

RESISTANCE

ANGLE ($\theta$)

FIG.9A
MAGNETIC FLUX LINES
FIG.9B
MR SENSOR
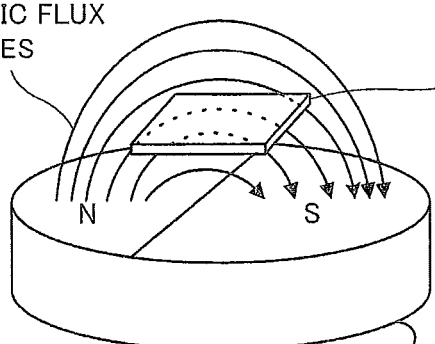
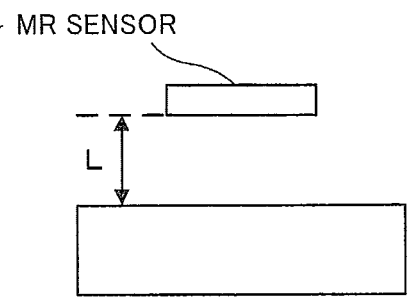
MOTION
FIG.9C
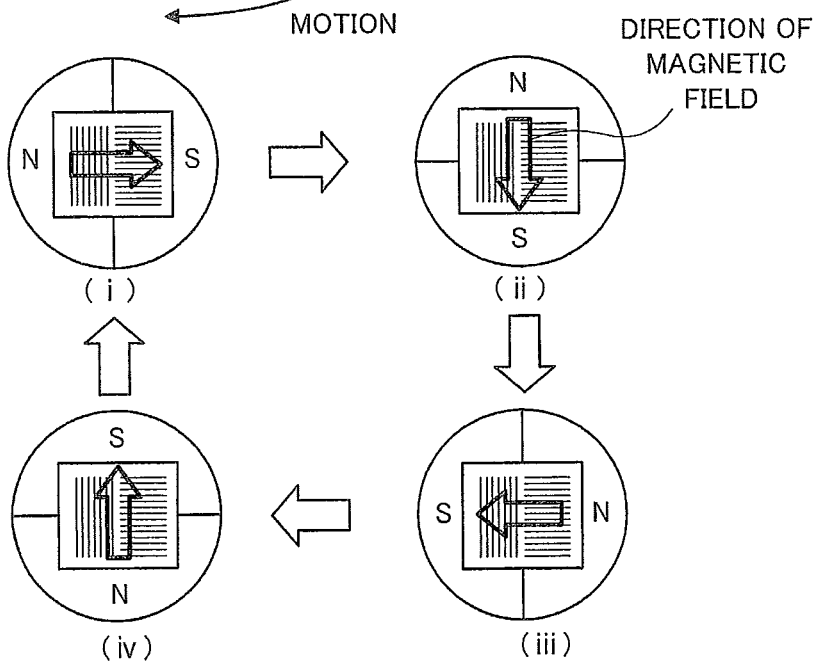
DIRECTION OF MAGNETIC FIELD
(i) (ii) (iii) (iv)
FIG.9D
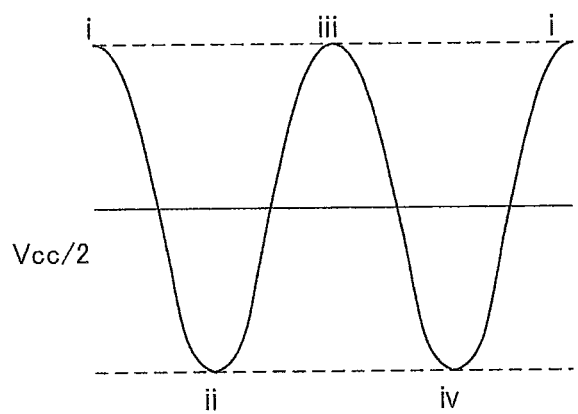
$V_{cc}/2$

ELEMENT CONFIGURATION

RELATIVE ANGLE DETECTION DEVICE, ROTATION ANGLE DETECTION DEVICE, RELATIVE ANGLE DETECTION METHOD, AND ROTATION ANGLE DETECTION METHOD

TECHNICAL FIELD

The present invention relates to a relative angle detection device, a rotation angle detection device, a relative angle detection method, and a rotation angle detection method.

BACKGROUND ART

In recent years, a device that detects a rotation angle of a rotary shaft has been suggested.

For example, Patent Literature 1 describes a rotation angle detection device having a following configuration. Specifically, the rotation angle detection device described in Patent Literature 1 is a rotation angle detection device including: a magnetic rotor having a bipolar magnet; and a sensing device that senses a direction of magnetic flux from the magnetic rotor. The sensing device has a magnetically sensitive surface configured with plural magnetoresistance effect elements, and is provided with respect to the magnetic rotor such that the magnetic flux is intersected with the magnetically sensitive surface and magnitudes of amplitudes of the magnetic flux density components orthogonal to each other in the magnetically sensitive surface are equal to each other.

CITATION LIST

Patent Literature

Patent Document 1: Japanese Patent Application Laid Open Publication No. 2009-25319.

DISCLOSURE OF INVENTION

Technical Problem

As a device that detects a relative rotation angle between two coaxially arranged rotary shafts, a configuration in which a magnet is attached to any one of the two rotary shafts and a magnetic field sensing unit that senses a magnetic field of the magnet is attached to the other rotary shaft is considered. Moreover, as a device that detects a rotation angle of a rotating body rotatably supported by a housing, a configuration in which a magnet is attached to any one of the housing and the rotating body, and a magnetic field sensing unit that senses a magnetic field of the magnet is attached to the other is considered. In such a configuration, even if the magnitudes of the amplitudes of the magnetic field components orthogonal to each other in a magnetically sensitive surface of the magnetic field sensing unit are different from each other, it is desirable that the relative rotation angle or the rotation angle can be sensed with high accuracy.

Solution to Problem

In order to attain the object, the present invention provides a relative angle detection device that detects a relative angle between a first rotary shaft and a second rotary shaft, the relative angle detection device including: a magnet that is provided to any one rotary shaft out of the first rotary shaft and the second rotary shaft; a first magnetic field sensing unit that is provided to the other rotary shaft different from the one rotary shaft, and outputs a value according to a magnetic field of the magnet; a second magnetic field sensing unit that is provided to the other rotary shaft, outputs a value according to a magnetic field of the magnet, and outputs a value different from an output value of the first magnetic field sensing unit even if being placed in a magnetic field equal to a magnetic field of the first magnetic field sensing unit; a correction unit that corrects any one output value out of the output value of the first magnetic field sensing unit and an output value of the second magnetic field sensing unit in accordance with an amplitude ratio between magnetic field components orthogonal to each other in the magnetic field of the magnet; and a computing unit that computes a relative angle between the first rotary shaft and the second rotary shaft on the basis of the one output value having been corrected by the correction unit and the other output value different from the one output value.

Here, it is preferable that the correction unit makes a correction with a predetermined value in accordance with the amplitude ratio between the magnetic field components. Also, it is preferable that the relative angle detection device further includes a determination unit that determines a correction value according to the amplitude ratio between the magnetic field components, and the correction unit corrects the one output value with the correction value determined by the determination unit.

Moreover, it is preferable that the determination unit determines the correction value also in accordance with change of an environment where the first magnetic field sensing unit or the second magnetic field sensing unit is placed.

Further, it is preferable that the determination unit determines the correction value on the basis of the output value of the first magnetic field sensing unit and the output value of the second magnetic field sensing unit.

Furthermore, it is preferable that the predetermined value or the correction value is a value according to an amplitude ratio between amplitude of a magnetic field component in a direction of a rotation radius of the first rotary shaft and amplitude of a magnetic field component in a circumferential direction of the first rotary shaft.

From another standpoint, the present invention provides a rotation angle detection device that detects a rotation angle of a rotating body rotatably supported by a housing, the rotation angle detection device including: a magnet that is provided to one component out of the rotating body and the housing; a first magnetic field sensing unit that is provided to the other component out of the rotating body and the housing, different from the one component, and outputs a value according to a magnetic field of the magnet; a second magnetic field sensing unit that is provided to the other component, outputs a value according to a magnetic field of the magnet, and outputs a value different from an output value of the first magnetic field sensing unit even if being placed at a magnetic field equal to a magnetic field of the first magnetic field sensing unit; a correction unit that corrects any one output value out of the output value of the first magnetic field sensing unit and an output value of the second magnetic field sensing unit in accordance with an amplitude ratio between magnetic field components orthogonal to each other in the magnetic field of the magnet; and a computing unit that computes a rotation angle of the rotating body on the basis of the one output value having been corrected by the correction unit and the other output value different from the one output value.

Here, it is preferable that the correction unit makes a correction with a predetermined value in accordance with the amplitude ratio between the magnetic field components. Also, it is preferable that the rotation angle detection device further includes a determination unit that determines a correction value according to the amplitude ratio between the magnetic field components, and the correction unit corrects the one output value with the correction value determined by the determination unit.

Moreover, it is preferable that the determination unit determines the correction value also in accordance with change of an environment where the first magnetic field sensing unit or the second magnetic field sensing unit is placed.

Further, it is preferable that the determination unit determines the correction value on the basis of the output value of the first magnetic field sensing unit and the output value of the second magnetic field sensing unit.

Furthermore, it is preferable that the predetermined value or the correction value is a value according to an amplitude ratio between amplitude of a magnetic field component in a direction of a rotation radius of the first rotary shaft and amplitude of a magnetic field component in a circumferential direction of the first rotary shaft.

From further standpoint, the present invention provides a relative angle detection method of a relative angle detection device detecting a relative angle between a first rotary shaft and a second rotary shaft and including a magnet that is provided to any one rotary shaft out of the first rotary shaft and the second rotary shaft, a first magnetic field sensing unit that is provided to the other rotary shaft different from the one rotary shaft, and outputs a value according to a magnetic field of the magnet, and a second magnetic field sensing unit that is provided to the other rotary shaft, outputs a value according to a magnetic field of the magnet, and outputs a value different from an output value of the first magnetic field sensing unit even if being placed in a magnetic field equal to a magnetic field of the first magnetic field sensing unit, the relative angle detection method including: correcting any one output value out of the output value of the first magnetic field sensing unit and an output value of the second magnetic field sensing unit in accordance with an amplitude ratio between magnetic field components orthogonal to each other in the magnetic field of the magnet; and computing the relative angle between the first rotary shaft and the second rotary shaft on the basis of the one output value that has been corrected and the other output value different from the one output value.

From furthermore standpoint, the present invention provides a rotation angle detection method of a rotation angle detection device detecting a rotation angle of a rotating body rotatably supported by a housing, and including a magnet that is provided to one component out of the housing and the rotating body, a first magnetic field sensing unit that is provided to the other component out of the housing and the rotating body, different from the one component, and outputs a value according to a magnetic field of the magnet, and a second magnetic field sensing unit that is provided to the other component, outputs a value according to a magnetic field of the magnet, and outputs a value different from an output value of the first magnetic field sensing unit even if being placed at a magnetic field equal to a magnetic field of the first magnetic field sensing unit, the rotation angle detection method including: correcting any one output value out of the output value of the first magnetic field sensing unit and the output value of the second magnetic field sensing unit in accordance with an amplitude ratio between magnetic field components orthogonal to each other in the magnetic field of the magnet; and computing the rotation angle of the rotating body on the basis of the one output value that has been corrected and the other output value different from the one output value.

Advantageous Effects of Invention

According to the present invention, it is possible to sense a rotation angle with higher accuracy even if magnitudes of amplitudes of magnetic field components orthogonal to each other in a magnetically sensitive surface of a magnetic field sensing unit are different from each other, in comparison with a case where the present invention is not adopted.

BRIEF DESCRIPTION OF DRAWINGS

FIG. 2-1 is a perspective view of the sensing device according to the exemplary embodiments;

FIG. 2-2 is a diagram illustrating an example of a schematic configuration of an electronic control unit (ECU);

FIGS. 9A to 9D are diagrams illustrating a relationship between the change of the direction of the magnetic field and the output of the MR sensor when the magnet rotates;

DESCRIPTION OF EMBODIMENTS

Hereinafter, exemplary embodiments of the present invention will be described in detail with reference to the attached drawings.

Figure 1:
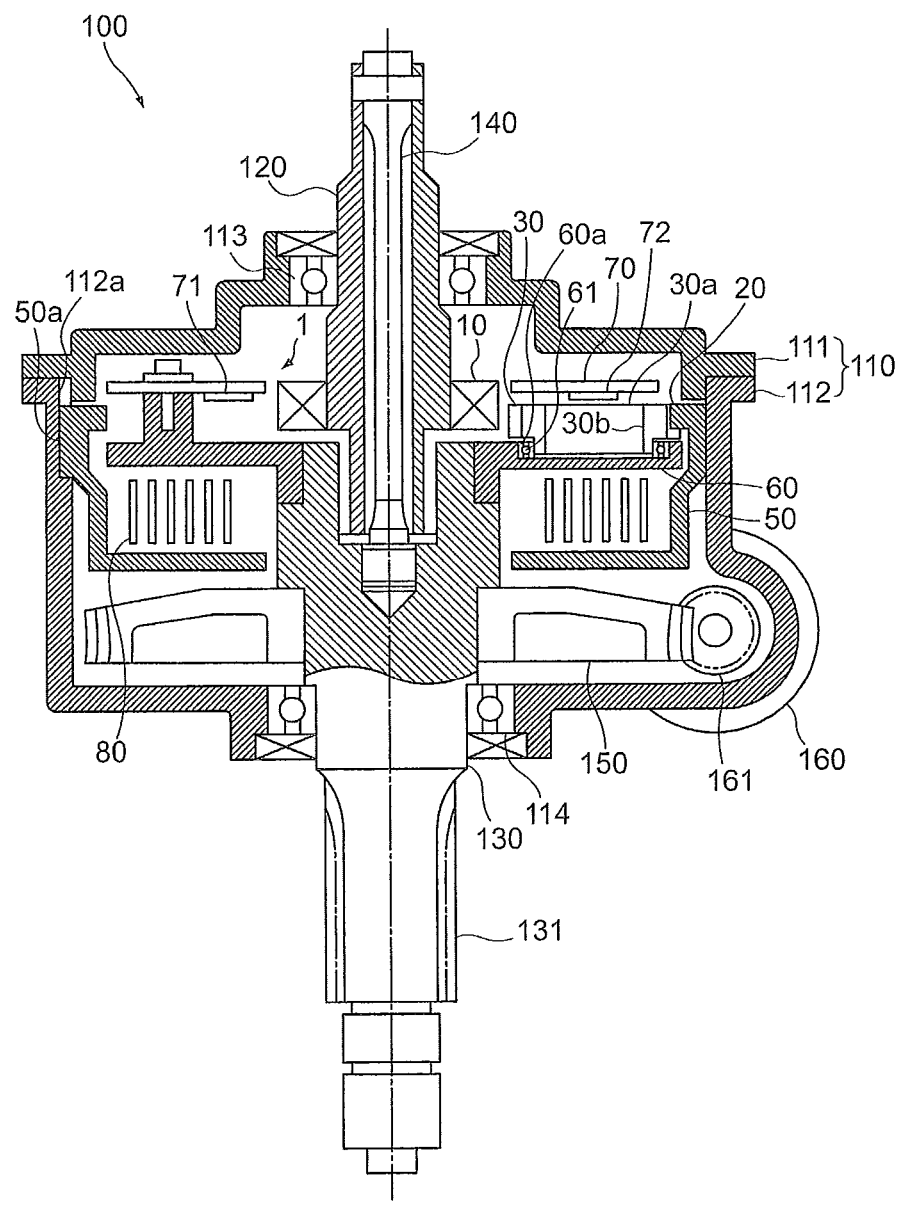
FIG. 1 is a cross-sectional view of an electric power steering apparatus to which a sensing device according to the exemplary embodiments is applied.
Figures 1, 2:
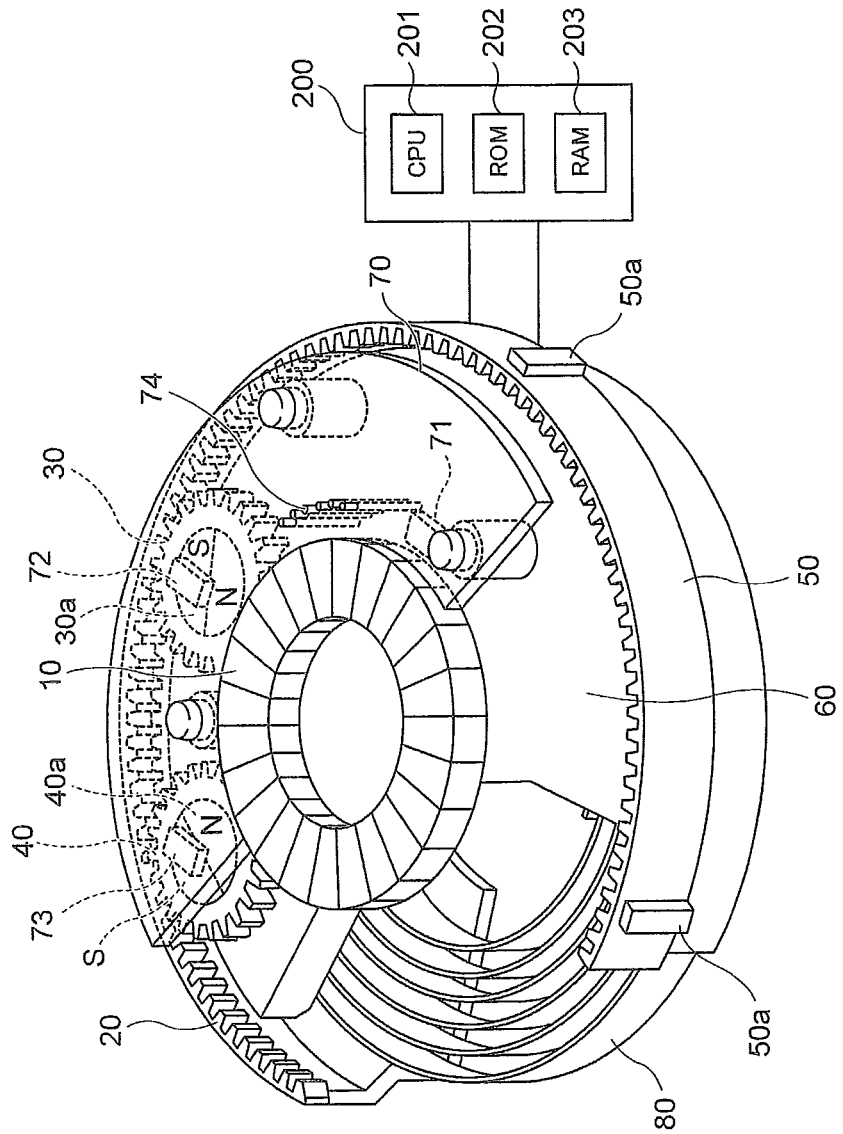
Figure 2:
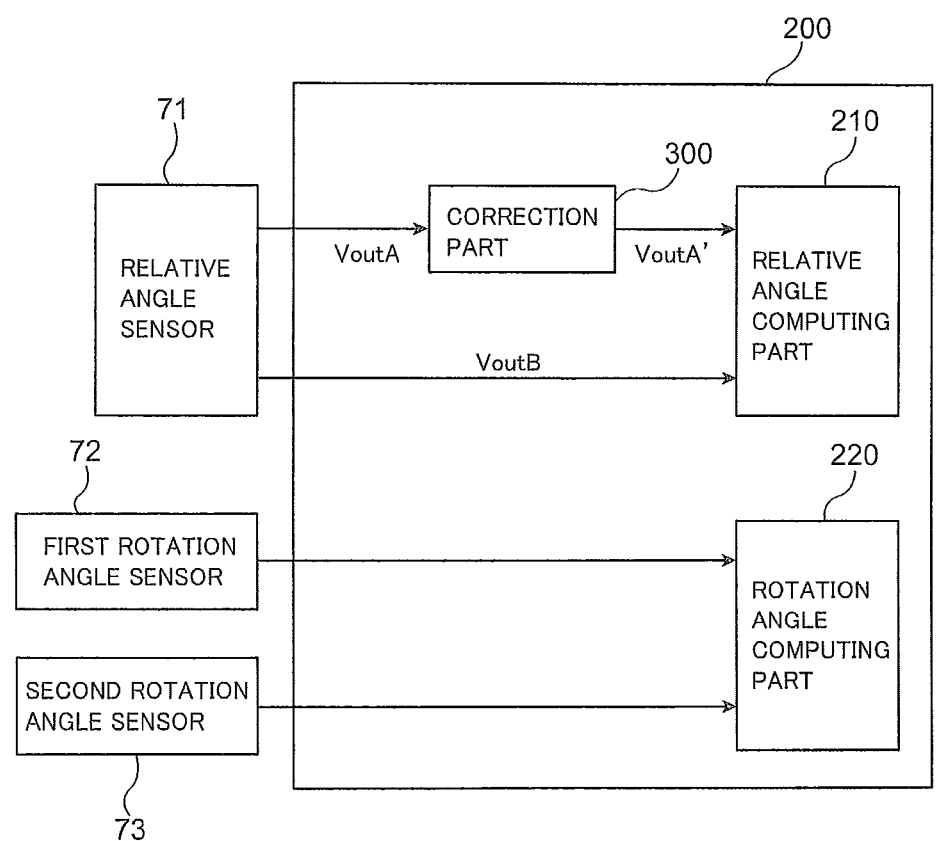

FIG. 1 is a cross-sectional view of an electric power steering apparatus 100 to which a sensing device 1 according to the exemplary embodiments is applied. FIG. 2-1 is a perspective view of the sensing device 1 according to the exemplary embodiments. FIG. 2-2 is a diagram illustrating an example of a schematic configuration of an electronic control unit (ECU) 200. It should be noted that, in order to easily understand the configuration, a part of a flat cable cover 50 and a base 60 that will be described later is omitted in FIG. 2-1.

The sensing device 1 is a device that senses a relative rotation angle between a first rotary shaft 120 rotatably supported by a housing 110 and a second rotary shaft 130 also rotatably supported by the housing 110, and senses a rotation angle of the second rotary shaft 130.

The housing 110 is, for example, a component that is fixed to a main frame of a vehicle such as an automobile (hereinafter, referred to as a "vehicle" in some cases), and is configured by joining a first housing 111 and a second housing 112 with, for example, a bolt.

The first rotary shaft 120 is, for example, a rotary shaft to which a steering wheel is connected, and is rotatably supported by the first housing 111 through a bearing 113.

The second rotary shaft 130 is coaxially connected to the first rotary shaft 120 through a torsion bar 140 and is rotatably supported by the second housing 112 through a bearing 114. A pinion 131 formed on the second rotary shaft 130 is engaged with a rack (not shown) of a rack shaft (not shown) connected to wheels. Rotational motion of the second rotary shaft 130 is converted into a linear motion of the rack shaft through the rack, and the wheels are operated.

In addition, to the second rotary shaft 130, a worm wheel 150 is fixed by, for example, press fitting. The worm wheel 150 is engaged with a worm gear 161 connected to an output shaft of an electric motor 160 fixed to the second housing 112.

In the electric power steering apparatus 100 having the aforementioned configuration, in consideration of the fact that steering torque applied to the steering wheel appears as the relative rotation angle between the first rotary shaft 120 and the second rotary shaft 130, the relative rotation angle between the first rotary shaft 120 and the second rotary shaft 130 is sensed by the sensing device 1. Then, the steering torque is recognized on the basis of the sensed relative rotation angle, the electric motor 160 is driven on the basis of the recognized steering torque, and generated torque of the electric motor 160 is transmitted to the second rotary shaft 130 through the worm gear 161 and the worm wheel 150. Thereby, the generated torque of the electric motor 160 assists steering force of a driver applied to the steering wheel.

Hereinafter, detailed description will be given for the sensing device 1.

The sensing device 1 has a first magnet 10 that is attached to the first rotary shaft 120, and a first gear wheel 20 that is fixed to the housing 110. Additionally, the sensing device 1 has a second gear wheel 30 that is engaged with the first gear wheel 20 to rotate by itself while revolving around a shaft center of the second rotary shaft 130 as a rotational center, along with the rotation of the second rotary shaft 130. Moreover, the sensing device 1 has a third gear wheel 40 that is engaged with the first gear wheel 20 to rotate by itself while revolving around a shaft center of the second rotary shaft 130 as a rotational center, along with the rotation of the second rotary shaft 130, and the number of teeth of the third gear wheel 40 is different from that of the second gear wheel 30.

The first magnet 10 has a cylindrical (toroidal) shape and the first rotary shaft 120 is fitted into the inside thereof. North poles and south poles are alternately arranged in the circumferential direction of the first rotary shaft 120 (refer to FIG. 16), and the first magnet 10 is magnetized in the circumferential direction.

The first gear wheel 20 is a gear wheel provided over the entire circumference of the inner circumferential surface of the upper portion of the is flat cable cover 50. By fixing the flat cable cover 50 to the second housing 112 of the housing 110, the first gear wheel 20 is fixed to the housing 110.

The following configuration is exemplified as a configuration in which the flat cable cover 50 is fixed to the housing 110. That is, plural convex parts 50a that are arranged on the outer circumferential surface of the flat cable cover 50 at regular intervals in the circumferential direction (4 convex parts arranged at intervals of 90 degrees in the exemplary embodiments) are formed so as to extend to the outside. On the other hand, on the second housing 112 of the housing 110, concave parts 112a the number of which is the same as the number of the convex parts 50a are formed, into which the convex parts 50a are fitted. By fitting the convex parts 50a of the flat cable cover 50 into the concave parts 112a formed on the second housing 112, the second rotary shaft 130 is positioned in the rotational direction. Further, by pressing the upper surface of the flat cable cover 50 with the first housing 111, positioning is conducted in the shaft direction of the second rotary shaft 130.

The sensing device 1 has the base 60 that is fixed to the second rotary shaft 130 and rotates together with the second rotary shaft 130. The second gear wheel 30 and the third gear wheel 40 are rotatably supported by the base 60. In other words, the second gear wheel 30 and the third gear wheel 40 are rotatably provided to the flat cable cover 50 fixed to the housing 110 so as to rotate around the shaft center of the second rotary shaft 130 as a rotational center.

A cylindrical second magnet 30a having a north pole and a south pole each of which is formed into a semicircular column is mounted on the inside of the second gear wheel 30, by, for example, insert molding. Moreover, a cylindrical third magnet 40a having a north pole and a south pole each of which is also formed into a semicircular column is mounted on the inside of the third gear wheel 40, by, for example, insert molding.

As a configuration in which the second gear wheel 30 is rotatably supported by the base 60, the following configuration can be exemplified. As shown in FIG. 1, a cylindrical concave part 60b is provided to the base 60, and a bearing 61 is mounted on the concave part 60a. On the other hand, a cylindrical convex part 30b is provided to the bottom surface of the second gear wheel 30. Then, the convex part 30b of the second gear wheel 30 is fitted into the inner peripheral surface of the bearing 61. Alternatively, a rotary shaft as a non-magnetic body may be provided at the rotational center part of the second gear wheel 30, that is, at the central part of the second magnet 30a, and the rotary shaft may be fitted into a shaft bearing (for example, a bearing) provided to the base 60. The third gear wheel 40 is also rotatably supported by the base 60 with the aforementioned configuration.

A printed substrate 70 where a wiring pattern (not shown) is formed is mounted on the base 60 by, for example, screw fixation such that the printed substrate 70 forms a predetermined space with the second gear wheel 30 and the third gear wheel 40. In other words, the printed substrate 70 is rotatably provided to the flat cable cover 50 fixed to the housing 110 so as to rotate around the shat center of the second rotary shaft 130 as a rotational center.

As shown in FIGS. 1 and 2-1, a relative angle sensor 71 is mounted on the printed substrate 70 to be located at the outside of the outer circumferential surface of the first magnet 10 in a radial direction of the first rotary shaft 120 and within a region where the first magnet 10 is provided in the shaft direction of the first rotary shaft 120. The relative angle sensor 71 according to the exemplary embodiments is, as an example, a MR sensor (magnetoresistive element) that is a magnetic sensor using change in resistance by a magnetic field. The relative angle sensor 71 configures a relative angle sensing unit that senses the relative rotation angle between the first rotary shaft 120 and the second rotary shaft 130 on the basis of the magnetizing field of the first magnet 10 (magnetic field generated from the first magnet 10). Detailed description will be given later for the relative angle sensor 71 and the sensing method of the relative rotation angle.

A first rotation angle sensor 72 is mounted on the printed substrate 70 at a position facing the central part of the second magnet 30a to form a predetermined space with the second magnet 30a. In addition, a second rotation angle sensor 73 is mounted on the printed substrate 70 at a position facing the central part of the third magnet 40a to form a predetermined space with the third magnet 40a. The first and second rotation angle sensors 72 and 73 according to the exemplary embodiments are also, as an example, MR sensors (magnetoresistive elements). The first and second rotation angle sensors 72 and 73 configure a rotation angle sensing unit that senses the rotation angle of the second rotary shaft 130 on the basis of the angle of the self-rotation of the second gear wheel 30 and the angle of the self-rotation of the third gear wheel 40. Detailed description of the sensing method will be described later.

A connector 74 electrically connected to the wiring pattern is attached to the printed substrate 70, and a connector (not shown) provided at one tip end part of a flat cable 80 is connected to the connector 74. As shown in FIG. 2-1, the flat cable 80 is spirally wound below the base 60 and at the inside of the flat cable cover 50. The one tip end part of the flat cable 80 is connected to the connector 74 located above the base 60 through a hole formed in the base 60. The other tip end part of the flat cable 80 is taken out from the inside of the flat cable cover 50 through a hole formed in the flat cable cover 50, and, for example, is connected to a connecter (not shown) provided to a printed substrate (control substrate) of the electronic control unit (ECU) 200 that controls the electric power steering apparatus 100, at the outside of the flat cable cover 50. The ECU 200 is provided with: a CPU 201 that conducts various kinds of arithmetic processing; a ROM 202 in which programs executed in the CPU 201, various kinds of data and the like are memorized; and a RAM 203 used as a working memory or the like for the CPU 201.

The sensing device 1 is provided with: a relative angle computing part 210 that computes the relative rotation angle between the first rotary shaft 120 and the second rotary shaft 130 on the basis of the sensed value of the relative angle sensor 71; and a rotation angle computing part 220 that computes the rotation angle of the second rotary shaft 130 on the basis of the sensed values of the first and second rotation angle sensors 72 and 73. The relative angle computing part 210 configures the aforementioned relative angle sensing unit, and the rotation angle computing part 220 configures the aforementioned rotation angle sensing unit. The relative angle computing part 210 and the rotation angle computing part 220 may be mounted on a printed substrate (for example, a substrate provided to the aforementioned ECU 200) that is provided at the outside of the flat cable cover 50 aside from the printed substrate 70, or mounted on the printed substrate 70. FIG. 2-2 shows a configuration in which the relative angle computing part 210 and the rotation angle computing part 220 are configured in the substrate provided in the ECU 200, as an example.

In the case where the relative angle computing part 210 and the rotation angle computing part 220 are mounted on another printed substrate other than the printed substrate 70, the sensed values of the relative angle sensor 71 and the first and second rotation angle sensors 72 and 73 are configured to be outputted to the relative angle computing part 210 or the rotation angle computing part 220 through the flat cable 80. Meanwhile, in the case where the relative angle computing part 210 and the rotation angle computing part 220 are mounted on the printed substrate 70, after the relative rotation angle or the rotation angle is computed on the basis of the sensed values of the relative angle sensor 71 and the first and second rotation angle sensors 72 and 73 in the relative angle computing part 210 and the rotation angle computing part 220, the computed results are outputted to the ECU 200 or the like through the flat cable 80.

Hereinafter, description will be given for the relative angle sensor 71 and the first and second rotation angle sensors 72 and 73 according to the exemplary embodiments.

The relative angle sensor 71 and the first and second rotation angle sensors 72 and 73 according to the exemplary embodiments are MR sensors (magnetoresistive elements) using change in resistance according to a magnetizing field (magnetic field).

First, an operating principle of the MR sensor will be described.

The MR sensor is composed of a Si or a glass substrate, and a thin film that is formed thereon and is made of an alloy mainly containing a ferromagnetic metal such as Ni—Fe, and the resistance of the thin-film ferromagnetic metal changes in accordance with intensity of a magnetic field in a specific direction.

Figure 3:
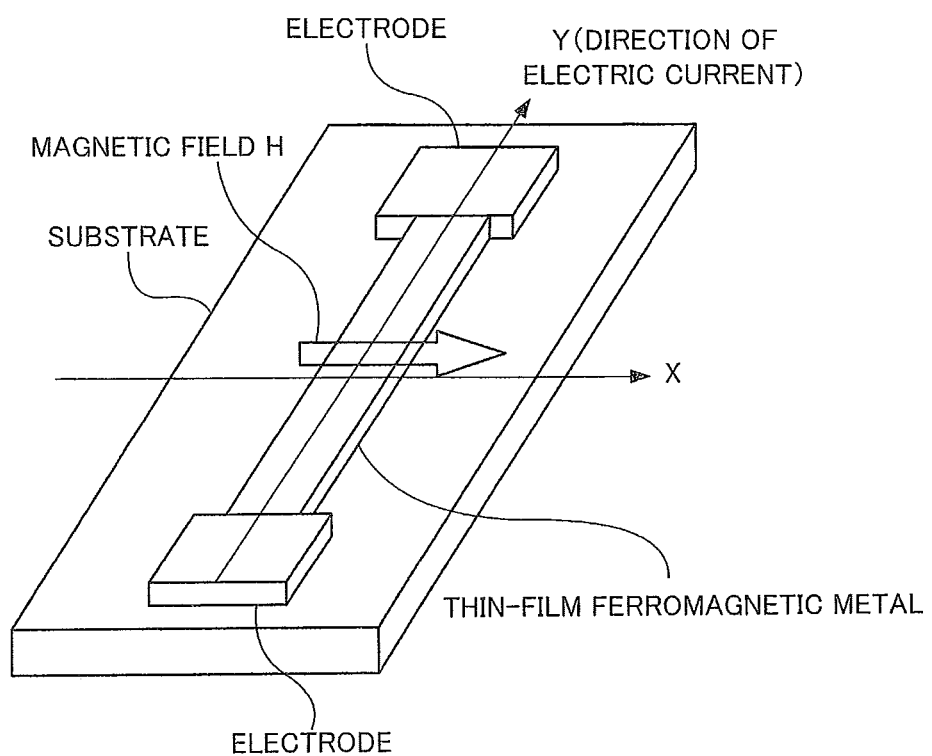
FIG. 3 is a diagram illustrating a direction of an electric current passed through the thin-film ferromagnetic metal and a direction of a magnetic field to be applied.
Figure 4:
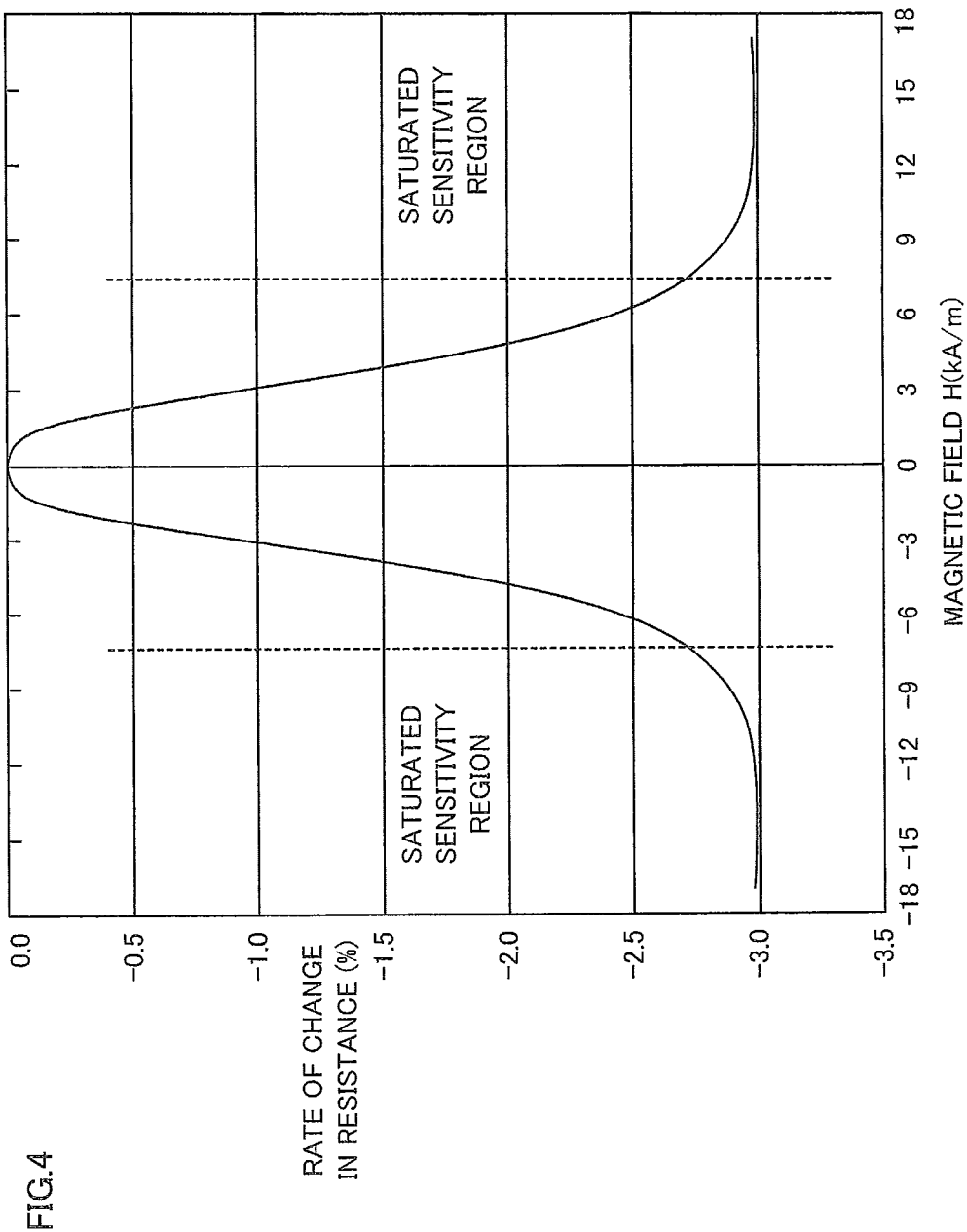
FIG. 4 is a graph showing a relationship between intensity of the magnetic field and resistance of the thin-film ferromagnetic metal in a case where the intensity of the magnetic field is changed in the state shown in FIG. 3.

FIG. 3 is a diagram illustrating a direction of an electric current passed through the thin-film ferromagnetic metal and a direction of a magnetic field to be applied. FIG. 4 is a graph showing a relationship between intensity of the magnetic field and resistance of the thin-film ferromagnetic metal in a case where the intensity of the magnetic field is changed in the state shown in FIG. 3.

As shown in FIG. 3, an electric current is passed through the thin-film ferromagnetic metal forming into a rectangle on the substrate in a long side direction of the rectangle, that is, a Y direction in the figure. On the other hand, a magnetic field H is applied thereto in a vertical direction (X direction in the figure) with respect to the direction of the electric current (Y direction), and the intensity of the magnetic field is changed in this condition. It is FIG. 4 that shows how the resistance of the thin-film ferromagnetic metal is changed in such a condition.

As shown in FIG. 4, even if the intensity of the magnetic field is changed, change in the resistance from a point at no magnetic field (point where the intensity of the magnetic field is zero) is up to approximately 3%.

Hereinafter, a region outside a region in which the amount of change in the resistance ($\Delta R$) is approximately represented by a formula, "$\Delta R \propto H^2$" is referred to as a "saturated sensitivity region." In the saturated sensitivity region, the change in the resistance of 3% does not vary if the intensity of the magnetic field is not less than certain intensity (hereinafter, referred to as "specified intensity of the magnetic field").

Figure 5:
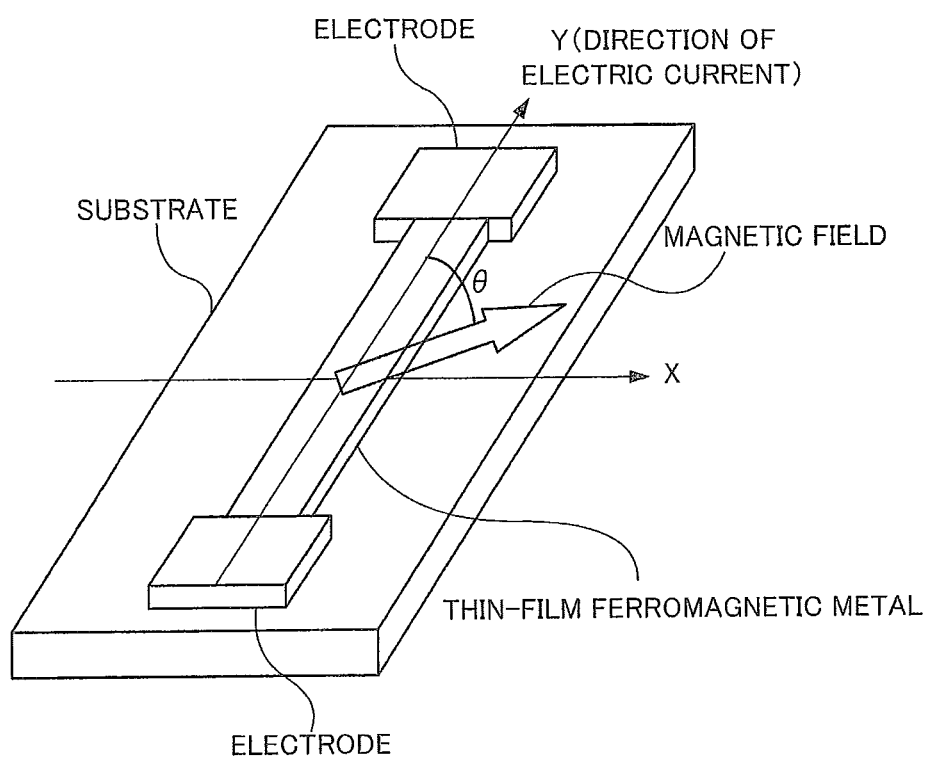
FIG. 5 is a diagram illustrating a direction of an electric current passed through the thin-film ferromagnetic metal and a direction of a magnetic field to be applied.
Figure 6A:
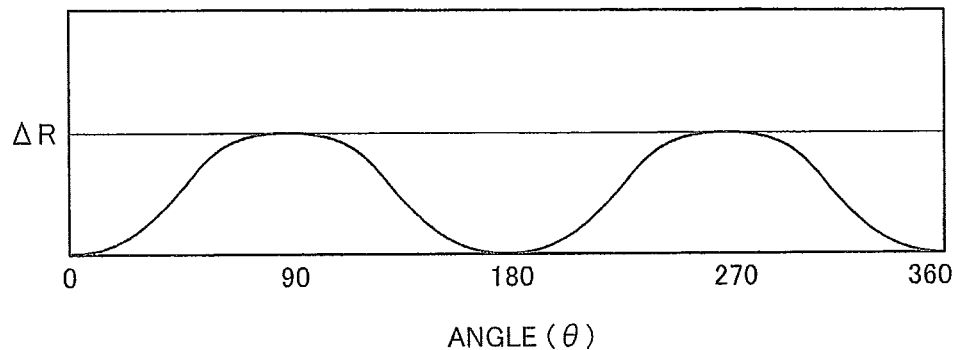
FIGS. 6A and 6B are graphs showing a relationship between the direction of the magnetic field and the resistance of the thin-film ferromagnetic metal.
Figure 6B:
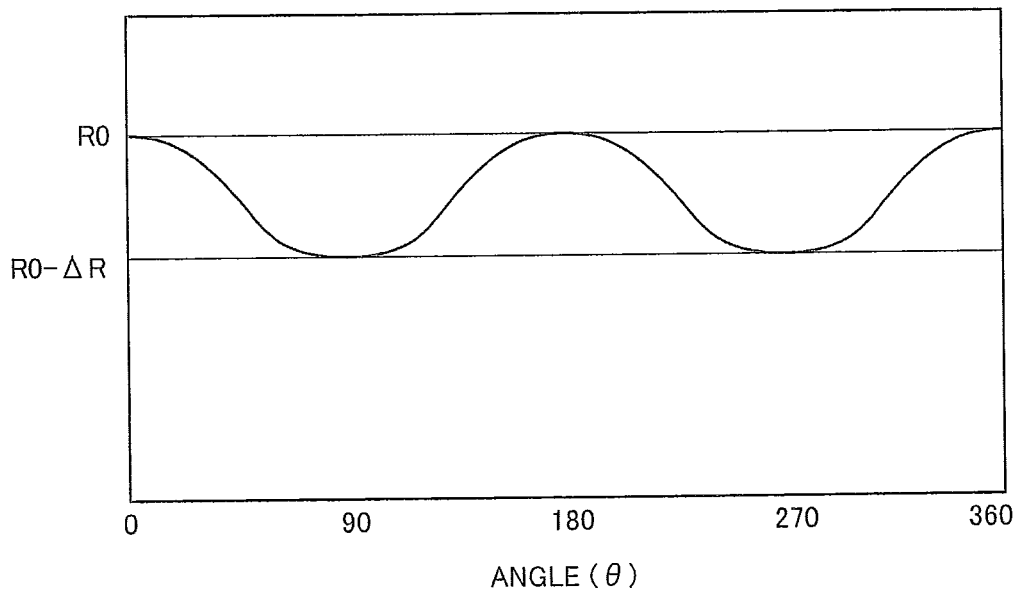

FIG. 5 is a diagram illustrating a direction of an electric current passed through the thin-film ferromagnetic metal and a direction of a magnetic field to be applied. FIGS. 6A and 6B are graphs showing a relationship between the direction of the magnetic field and the resistance of the thin-film ferromagnetic metal.

As shown in FIG. 5, an electric current is made to flow in a direction of the long side of the rectangle forming the thin-film ferromagnetic metal, that is, a Y direction in the figure, and, as a direction of the magnetic field, change of an angle θ is given with respect to the direction of the electric current. At this time, in order to recognize change in the resistance of the thin-film ferromagnetic metal due to the direction of the magnetic field, the intensity of the magnetic field applied thereto is not less than the aforementioned specified intensity of the magnetic field at which the resistance does not change due to the intensity of the magnetic field.

As shown in FIG. 6A, the amount of change in the resistance is maximum when the direction of the electric current and the direction of the magnetic field are vertical to each other (θ=90 degrees, or 270 degrees), and is minimum when the direction of the electric current and the direction of the magnetic field are parallel to each other (θ=0 degree, or 180 degrees). If the maximum amount of change in the resistance in this case is set as $\Delta R$, the resistance R of the thin-film ferromagnetic metal changes as an angular component between the direction of the electric current and the direction of the magnetic field, is represented by an equation (1), and is shown in FIG. 6B.

$$R = R0 - \Delta R \sin^2\theta \quad (1)$$

Herein, R0 denotes the resistance in the case where the magnetic field not less than the specified intensity of the magnetic field is applied thereto so as to be parallel to the direction of the electric current (θ=0 degree or 180 degrees).

By the equation (1), the direction of the magnetic field not less than the specified intensity of the magnetic field can be sensed by recognizing the resistance of the thin-film ferromagnetic metal.

Next, a sensing principle of the MR sensor will be described.

Figure 7:
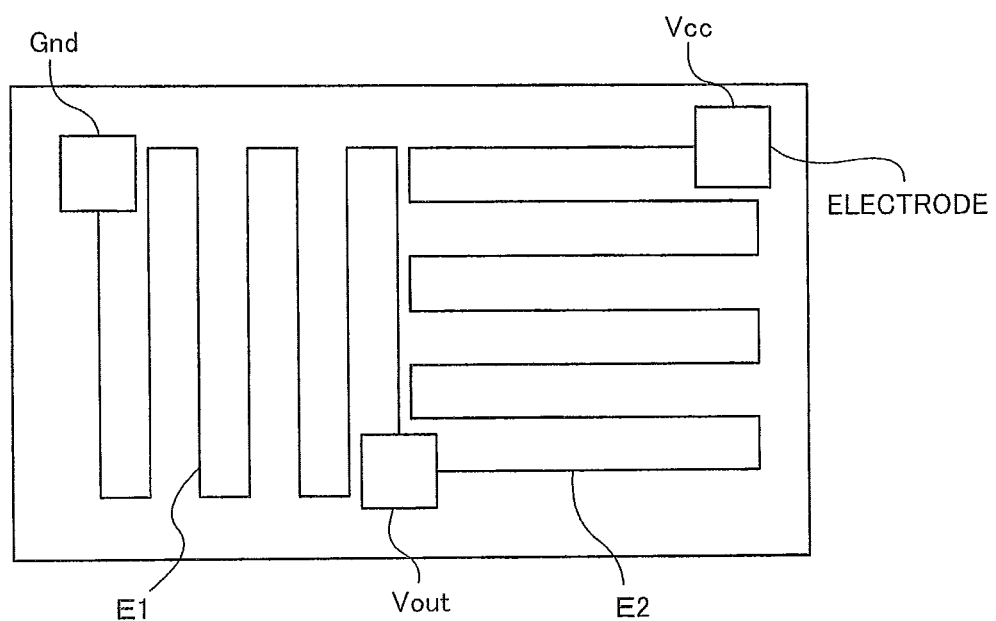
FIG. 7 is a diagram illustrating an example of the MR sensor using a principle for sensing a direction of a magnetic field under intensity of a magnetic field not less than the specified intensity of the magnetic field.

FIG. 7 is a diagram illustrating an example of the MR sensor using a principle for sensing a direction of a magnetic field under intensity of a magnetic field not less than the specified intensity of the magnetic field.

In the thin-film ferromagnetic metal of the MR sensor shown in FIG. 7, a first element E1 that is formed so as to have a longer side in the vertical direction and a second element E2 that is formed so as to have a longer side in the horizontal direction are arranged in series.

In the thin-film ferromagnetic metal having such a shape, the magnetic field in the vertical direction, which leads to the maximum change in the resistance with respect to the first element E1, is the magnetic field in the direction leading to the minimum change in the resistance with respect to the second element E2. The resistance R1 of the first element E1 is given by an equation (2), and the resistance R2 of the second element E2 is given by an equation (3).

$$R1 = R0 - \Delta R \sin^2\theta \quad (2)$$

$$R2 = R0 - \Delta R \cos^2\theta \quad (3)$$

Figure 8:
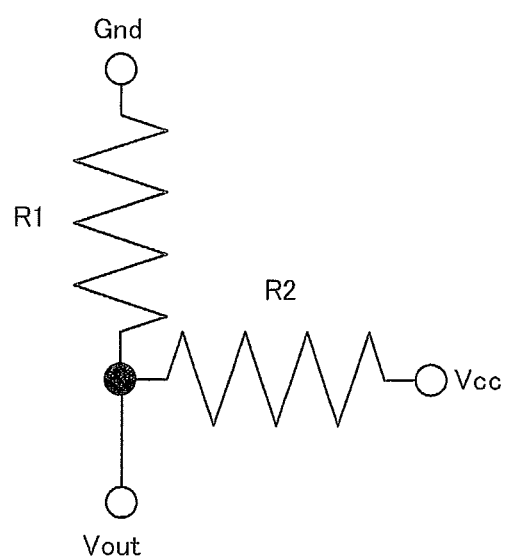
FIG. 8 is a diagram illustrating the configuration of the MR sensor shown in FIG. 7 as an equivalent circuit.

FIG. 8 is a diagram illustrating the configuration of the MR sensor shown in FIG. 7 as an equivalent circuit.

The equivalent circuit of the MR sensor having the element configuration shown in FIG. 7 is shown in FIG. 8.

As shown in FIGS. 7 and 8, in the case where an end of the first element E1, which is not connected to the second element E2, is set as a ground (Gnd), and an end of the second element E2, which is not connected to the first element E1, is set to have an output voltage of Vcc, an output voltage Vout at a connecting part between the first element E1 and the second element E2 is given by an equation (4).

$$Vout = (R1/(R1+R2)) \times Vcc \quad (4)$$

When the equations (2) and (3) are substituted into the equation (4) and the resultant equation is reorganized, an equation (5) is obtained.

$$Vout = Vcc/2 + \alpha \times \cos 2\theta \quad (5)$$

Herein, $\alpha = (\Delta R/(2 \times (2 \times R0 - \Delta R))) \times Vcc$.

By the equation (5), the direction of the magnetic field can be recognized by sensing the Vout.

Description will be given for change of the direction of the magnetic field and an output of the MR sensor when the magnet moves.

FIGS. 9A to 9D are diagrams illustrating a relationship between the change of the direction of the magnetic field and the output of the MR sensor when the magnet rotates.

As shown in FIG. 9A, the MR sensor shown in FIG. 7 is arranged so as to face one surface of the cylindrical magnet formed by the north pole and the south pole which are formed into a semicircular column in the central axis direction thereof. At this time, a gap L between the magnet and the MR sensor shown in FIG. 9B is set to be a distance where the intensity of the magnetic field not less than the specified intensity of the magnetic field is applied to the MR sensor.

As shown in FIG. 9C, the magnet is rotated around the central axis in a manner that the state of the magnet is changed from (i) to (ii), from (ii) to (iii), from (iii) to (iv), and from (iv) to (i). In this case, the magnet generates magnetic flux lines from the north pole to the south pole, and the magnetic flux lines indicate the direction of the magnetic field, and thus the magnetic field having the direction of arrows shown in FIG. 9C is to be applied to the MR sensor in accordance with the direction of the magnet. That is, when the magnet rotates by 360 degrees, the direction of the magnetic field also rotates by 360 degrees on the surface of the sensor.

In this case, a waveform of the output voltage Vout at the connection part between the first element E1 and the second element E2 satisfies "Vout=Vcc/2+α×cos 2θ" shown in the equation (5), and has 2 cycles as shown in FIG. 9D.

FIGS. 10A to 10D are diagrams illustrating a relationship between the change of the direction of the magnetic field and the output of the MR sensor when the magnet moves in a straight line.

Figure 10A:
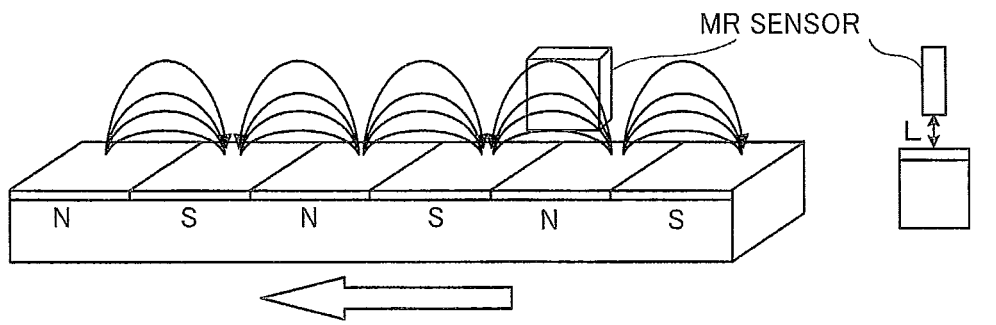
FIGS. 10A to 10D are diagrams illustrating a relationship between the change of the direction of the magnetic field and the output of the MR sensor when the magnet moves in a straight line.
Figure 10B:
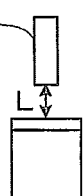

As shown in FIG. 10A, the MR sensor shown in FIG. 7 is arranged with respect to the magnet in which north poles and south poles are alternately arranged so that the intensity of the magnetic field not less than the specified intensity of the magnetic field is applied thereto with a gap L (distance between the magnet and the MR sensor), and change of the direction of the magnetic field affects a sensor surface of the MR sensor.

Figure 10C:
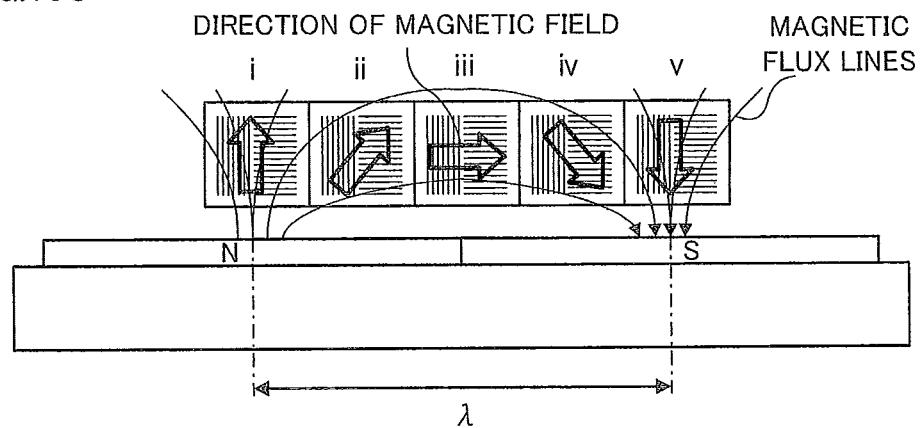
Figure 10D:
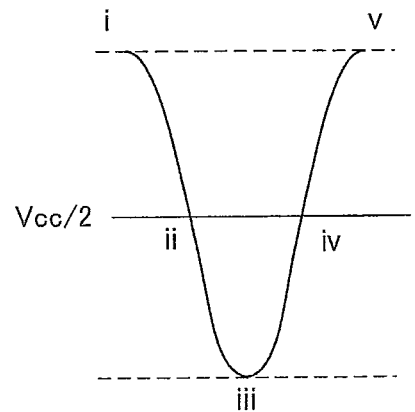

Then, the magnet is moved to the left as shown in FIG. 10A. As shown in FIG. 10C, the magnet is moved by a distance λ from the center of the north pole to the center of the south pole (hereinafter, referred to as a "magnetized pitch" in some cases). In this case, the magnetic field whose direction is shown with arrows in FIG. 10C is applied to the MR sensor in accordance with the position of the magnet, and the direction of the magnetic field is half rotated on the sensor surface when the magnet moves by the magnetized pitch λ. Accordingly, a waveform of the output voltage Vout at the connecting part between the first element E1 and the second element E2 has one cycle as shown in FIG. 10D because of the equation (5), "Vout=Vcc/2+α×cos 2θ."

Figure 11B:
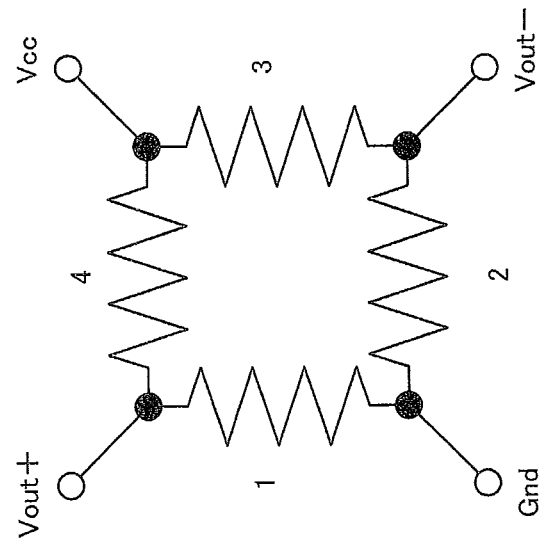
FIGS. 11A and 11B are diagrams illustrating another example of the MR sensor.
Figure 11A:
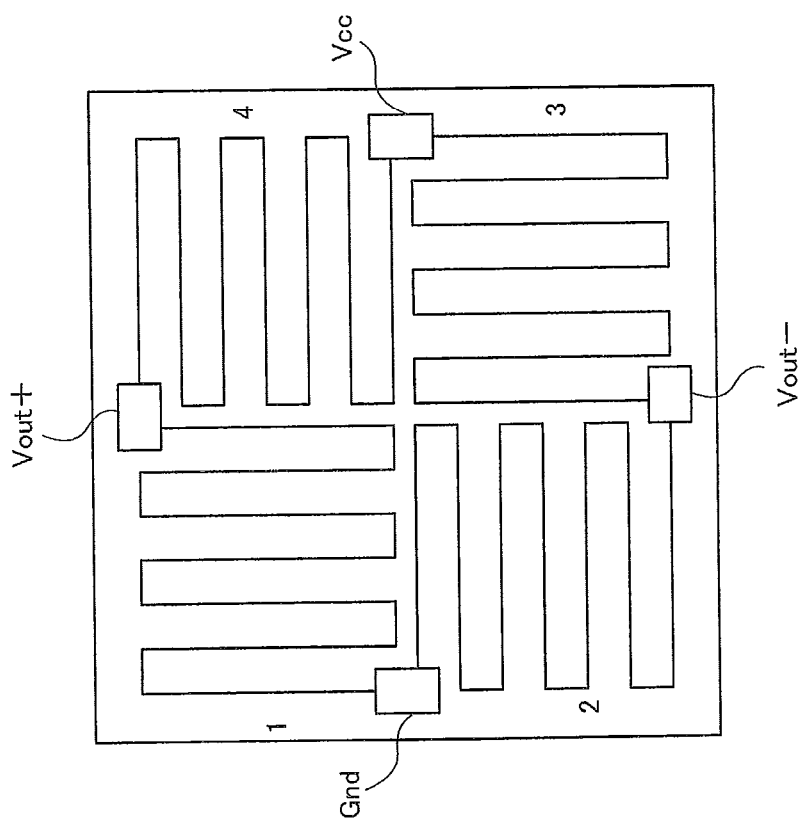

FIGS. 11A and 11B are diagrams illustrating another example of the MR sensor.

Instead of the element configuration shown in FIG. 7, if an element configuration shown in FIG. 11A is adopted, a commonly-known configuration having a Wheatstone bridge (full bridge) is achieved, as shown in FIG. 11B. Thus, by using the MR sensor having the element configuration shown in FIG. 11A, it is possible to enhance sensing accuracy.

Description will be given for a method for sensing a moving direction of the magnet.

From the relationship between the direction of the magnetic field and the resistance of the thin-film ferromagnetic metal shown in FIGS. 6A and 6B and the equation (1), "R=R0−ΔR sin²θ," the resistance of the thin-film ferromagnetic metal is the same in both cases in which the direction of the magnetic field is rotated in a clockwise direction with respect to the direction of the current, and in a counterclockwise direction when it is seen in FIG. 5. Accordingly, although the resistance of the thin-film ferromagnetic metal can be recognized, the moving direction of the magnet cannot be recognized.

Figure 12:
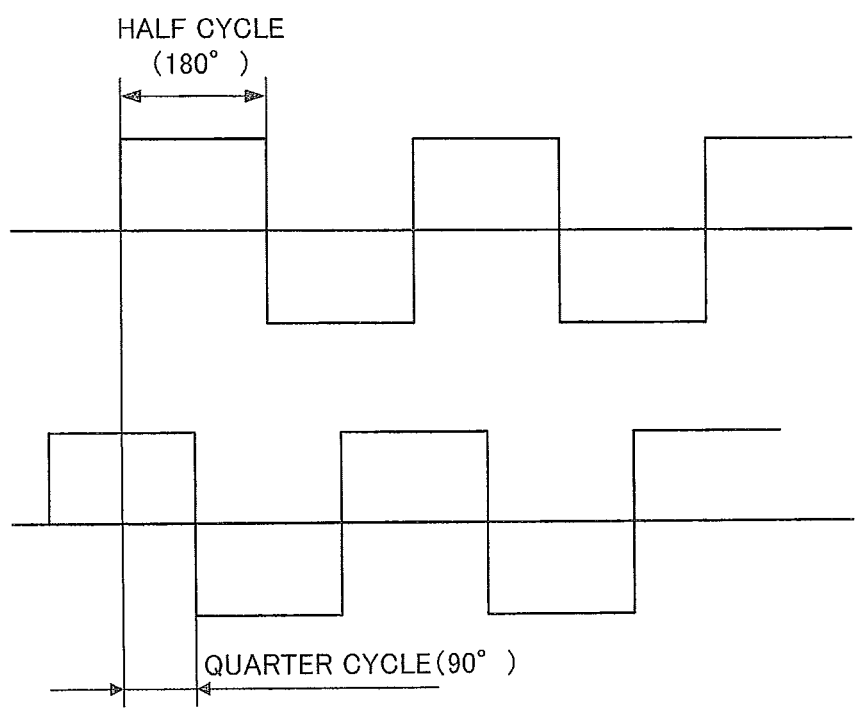
FIG. 12 is a diagram illustrating one example of a combination of outputs used for sensing a moving direction of the magnet.

FIG. 12 is a diagram illustrating one example of a combination of outputs used for sensing a moving direction of the magnet. As shown in FIG. 12, by combining two outputs having phase difference of a quarter cycle, the moving direction of the magnet can be sensed. In order to obtain these outputs, it is only necessary that two MR sensors are arranged to have a phase relationship such as (i) and (ii) or (i) and (iv) shown in FIG. 10C.

Figure 13:
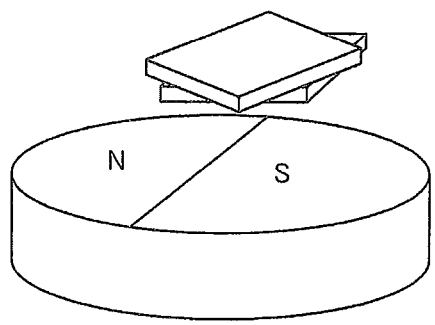
FIG. 13 is a diagram illustrating an example of arrangement of the MR sensors.
Figure 13:
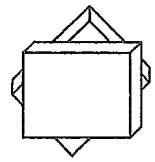
Figure 13:
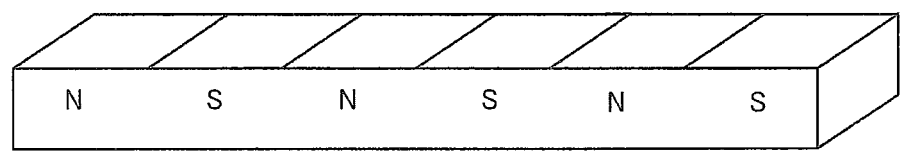
Figure 13:
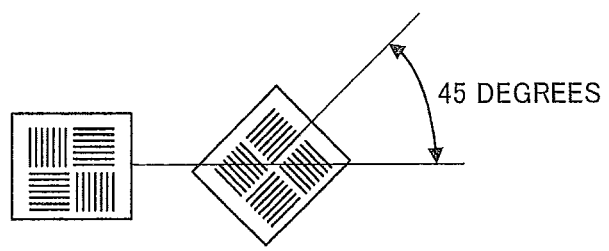

FIG. 13 is a diagram illustrating an example of arrangement of the MR sensors. As shown in FIG. 13, it is preferable that two MR sensors are stacked and arranged so that one sensor has an angle of 45 degrees with respect to the other sensor.

Figure 14A:
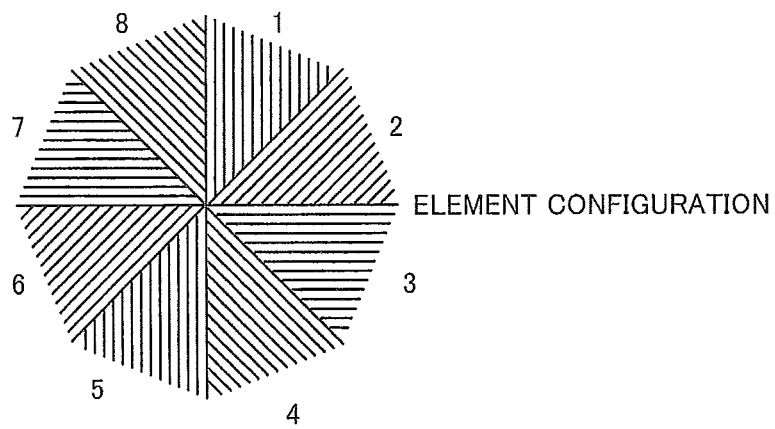
FIG. 14A to 14C are diagrams illustrating another example of the MR sensor.
Figure 14B:
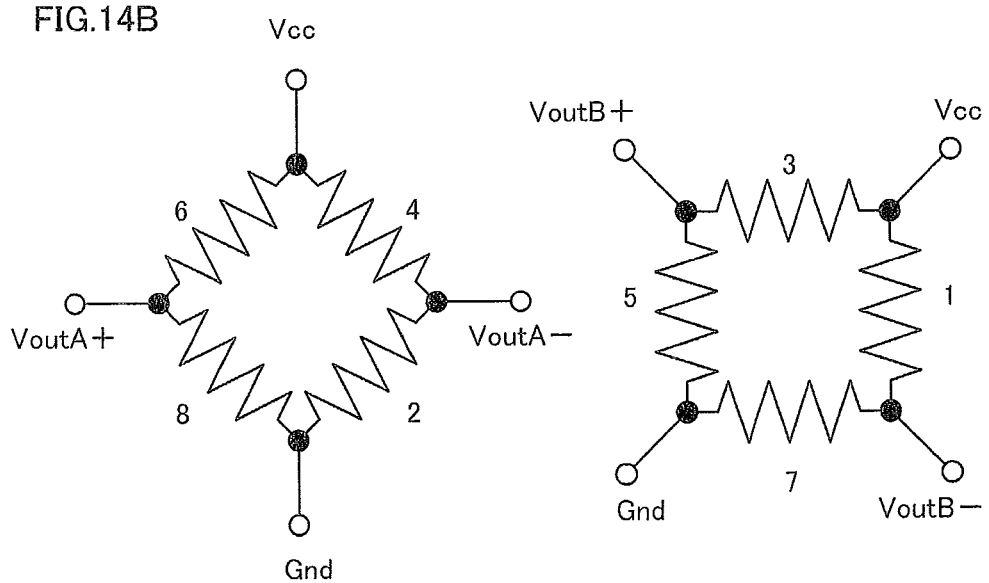
Figure 14C:
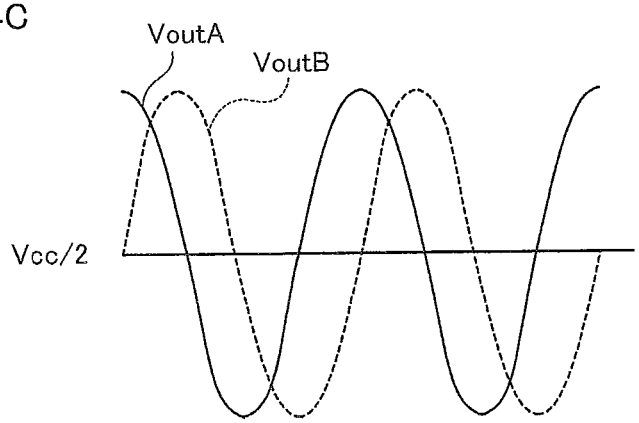

FIG. 14A to 14C are diagrams illustrating another example of the MR sensor. It is preferable that, as shown in FIG. 14A, two pairs of elements each having a full-bridge configuration are formed on one substrate so as to have an angle of 45 degrees with respect to each other, and the element configuration forming an equivalent circuit shown in FIG. 14B is formed. By this configuration, as shown in FIG. 14C, it is possible to output accurate sine and cosine waves by one MR sensor. Thus, the moving direction and the amount of the movement of the magnet with respect to the MR sensor can be recognized by the output value of the MR sensor having the element configuration shown in FIGS. 14A to 14C.

In consideration of the aforementioned characteristics of the MR sensor, MR sensors which will be described later are used as the relative angle sensor 71 and the first and second rotation angle sensors 72 and 73 in the sensing device 1 according to the exemplary embodiments.

First, the MR sensor having the element configuration shown in FIG. 14A is used as the relative angle sensor 71. As mentioned above, the relative angle sensor 71 is vertically arranged with respect to the outer circumferential surface of the first magnet 10, and the position thereof in the shaft direction of the second rotary shaft 130 is within the region of the first magnet 10. Thus, in this case, the relative angle sensor 71 shows change of the direction of the magnetic field shown in FIG. 10C in accordance with the position of the first magnet 10 by the magnetic field of the first magnet 10 rotating together with the first rotary shaft 120.

As a result, when the first magnet 10 moves (rotates) by the magnetized pitch λ, the direction of the magnetic field half rotates on the magnetically sensitive surface of the relative angle sensor 71 and the output values Vout A and Vout B from the relative angle sensor 71 are cosine and sine curves (waves) having phase difference of a quarter cycle as shown in FIG. 14C, respectively. Accordingly, the relative angle computing part 210 can compute the relative rotation angle θ between the first rotary shaft 120 and the second rotary shaft 130 on the basis of the output value Vout A and the Vout B from the relative angle sensor 71 by using the following equation (6).

$$\theta=\arctan(VoutB/VoutA) \tag{6}$$

It should be noted that the magnetically sensitive surface of the relative angle sensor 71 is a surface at which the magnetic field can be sensed in the relative angle sensor 71.

As mentioned above, any one element having the full-bridge configuration out of the two pairs of elements each having the full-bridge configuration formed on one substrate so as to have an angle of 45 degrees with respect to each other serves as one example of a first magnetic field sensing unit, and the other element having the full-bridge configuration out of the two pairs of elements each having the full-bridge configuration serves as one example of a second magnetic field sensing unit.

As the first rotation angle sensor 72 and the second rotation angle sensor 73, the MR sensors each having the element configuration shown in FIG. 11A are used. The first rotation angle sensor 72 is arranged so that the element and the upper surface of the cylindrical second magnet 30a face each other.

Further, the second rotation angle sensor 73 is arranged so that the element and the upper surface of the cylindrical third magnet 40a face each other.

In such a case, the direction of the magnetic field shown in FIG. 9C is obtained with respect to the first and second rotation angle sensors 72 and 73, and the relationship between the output waveform of Vout and the direction of the magnetic field shows a waveform shown in FIG. 9D. Thus, by the sensed values of the first and second rotation angle sensors 72 and 73, the rotation angles of the second and third gear wheels 30 and 40 can be recognized.

Figure 15:
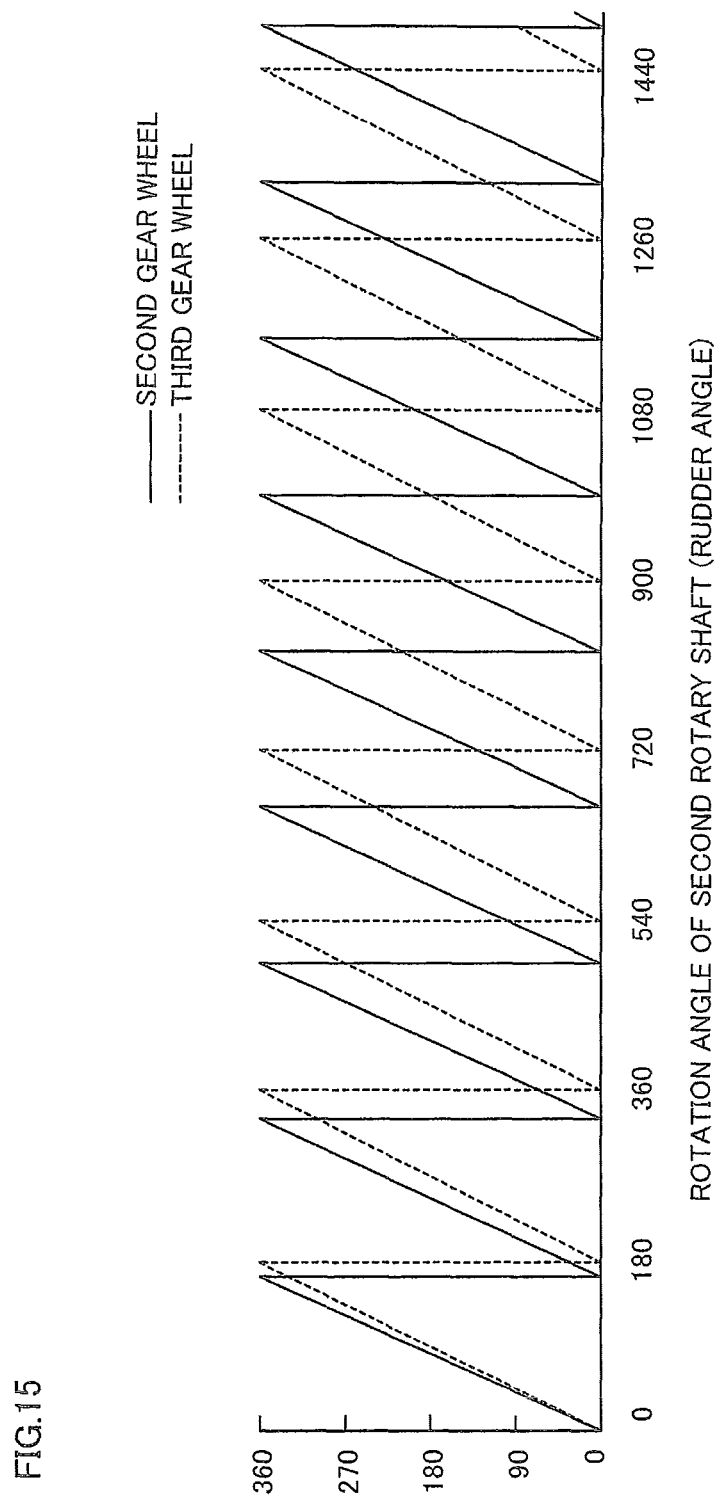
FIG. 15 is a graph showing the relationship between the rotation angle of the second rotary shaft and each of the rotation angles of the second and third gear wheels.

Further, in consideration of difference between the number of the teeth of the second gear wheel 30 and the number of the teeth of the third gear wheel 40 along with the relationship between the number of the teeth of the first gear wheel 20 and the number of the teeth of the second gear wheel 30 and the relationship between the number of the teeth of the first gear wheel 20 and the number of the teeth of the third gear wheel 40, a graph showing the relationship between the rotation angle of the second rotary shaft 130 and each of the rotation angles of the second and third gear wheels 30 and 40 can be obtained as shown in FIG. 15.

Accordingly, based on the aforementioned fact, the rotation angle computing part 220 can compute the rotation angle of the second rotary shaft 130 on the basis of the angular difference between the rotation angle of the second gear wheel 30 and the rotation angle of the third gear wheel 40.

The sensing device 1 having the aforementioned configuration functions as follows.

That is, when a user rotates a steering wheel, the first rotary shaft 120 rotates in connection with the rotation, and the torsion bar 140 twists. Then, the second rotary shaft 130 rotates a little after the first rotary shaft 120 rotates. This delay appears as difference between the rotation angle of the first rotary shaft 120 connected to the torsion bar 140 and the rotation angle of the second rotary shaft 130.

The relative angle computing part 210 computes the difference between the rotation angles by using the output value from the relative angle sensor 71 and the equation (6), and thereby the sensing device 1 can sense the relative rotation angle between the first rotary shaft 120 and the second rotary shaft 130 and the twisting direction, that is, the amount and the direction of the torque applied to the steering wheel.

When the second rotary shaft 130 rotates in connection with the rotation of the steering wheel, the second gear wheel 30 and the third gear wheel 40 which are engaged with the first gear wheel 20 rotate by themselves while revolving around the shaft center of the second rotary shaft 130 as the rotation center. In conjunction with these rotations, the second magnet 30a and the third magnet 40a also rotate. The rotations of the second and third magnets 30a and 40a are sensed by the first and second rotation angle sensors 72 and 73.

Then, by the computation of the rotation angle computing part 220 based on the output signals of the first and second rotation angle sensors 72 and 73, the sensing device 1 is capable of sensing the rotation angle of the second rotary shaft 130, that is, the rotation angle (rudder angle) of the steering wheel.

As the sensing device 1 having the aforementioned configuration is assembled, the flat cable cover 50, the base 60 to which the printed substrate 70 has been attached, and the flat cable 80 contained between the flat cable cover 50 and the base 60 are unitized in advance. Then, the unit is attached to the second housing 112 to which the second rotary shaft 130 is attached so that the convex part 50a of the flat cable cover 50 is fitted into the concave part 112a of the second housing 112. At this time, the base 60 is connected to the second rotary shaft 130.

As mentioned above, it is possible to improve an assembling property by making the sensing device 1 have the structure which can be unitized in advance.

The first gear wheel 20 is provided at the inner side of the flat cable cover 50, and the second and third gear wheels 30 and 40 which rotate by themselves and revolve while being engaged with the first gear wheel 20 are provided at the inner side of the flat cable cover 50. By sensing the rotation angles of the second and third gear wheels 30 and 40, the rotation angle of the second rotary shaft 130 is sensed. Moreover, the relative rotation angle between the first rotary shaft 120 and the second rotary shaft 130 is sensed on the basis of the output value of the relative angle sensor 71 arranged at the inner side of the flat cable cover 50. Thereby, downsizing of the sensing device 1 is achieved.

Further, the sensing device 1 having the aforementioned configuration have a function in which sensing error of the relative rotation angle $\theta$ between the first rotary shaft 120 and the second rotary shaft 130 can be suppressed, and the relative rotation angle $\theta$ can be sensed with high accuracy, even if the magnitudes of the amplitudes of the magnetic field components perpendicular to each other in the magnetically sensitive surface of the relative angle sensor 71 are different from each other.

Hereinbelow, detailed description for such a function will be given.

<First Exemplary Embodiment>

Figure 16:
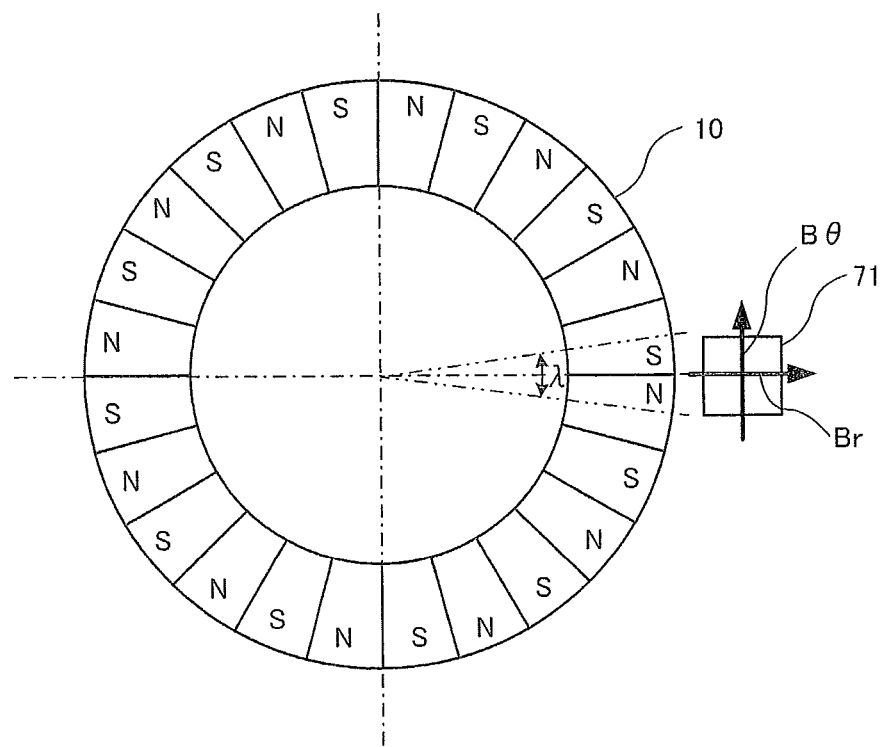
FIG. 16 is a view illustrating the magnetic field components in the magnetically sensitive surface of the relative angle sensor.

FIG. 16 is a view illustrating the magnetic field components in the magnetically sensitive surface of the relative angle sensor 71.

The magnetic field component in the direction of the rotation radius of the first rotary shaft 120 is set as a magnetic field component Br in the radial direction, and the magnetic field component of the first rotary shaft 120 in the circumferential direction is set as a magnetic field component B$\theta$ in the circumferential direction, and they are perpendicular to each other in the magnetically sensitive surface of the relative angle sensor 71. In the case where an amplitude of the magnetic field component Br in the radial direction and an amplitude of the magnetic field component B$\theta$ in the circumferential direction have the same magnitude, the Vout A and the Vout B as the output values from the relative angle sensor 71 become a perfect cosine curve and a perfect sine curve, respectively (refer to FIG. 14C). Accordingly, by computing the relative rotation angle $\theta$ between the first rotary shaft 120 and the second rotary shaft 130 on the basis of these output values, the sensing device 1 is capable of sensing the relative rotation angle $\theta$ with high accuracy.

However, there is a possibility that the amplitude of the magnetic field component Br in the radial direction and the amplitude of the magnetic field component B$\theta$ in the circumferential direction have different magnitude, and in such a case, Vout A and the Vout B as the output values from the relative angle sensor 71 are distorted, and sensing error may be caused.

Figure 17A:
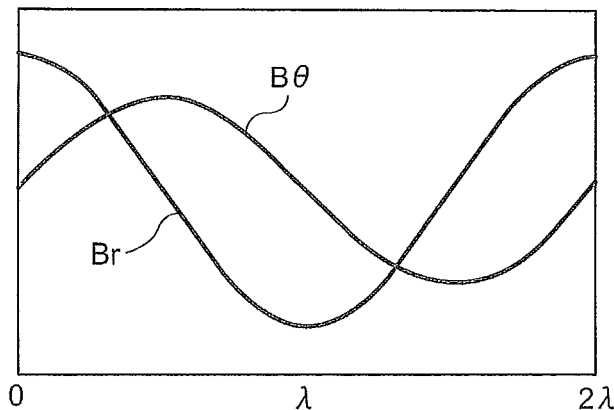
FIG. 17A is a graph showing the magnetic field component in the radial direction and the magnetic field component in the circumferential direction for twice the magnetization pitch, and this figure illustrates a case in which the amplitudes thereof are different from each other, as an example.
Figure 17B:
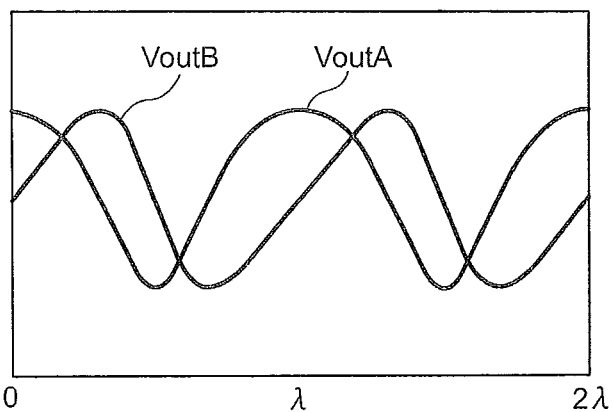
FIG. 17B is a graph showing the output values from the relative angle sensor in the case where the magnetic field component in the radial direction and the magnetic field component in the circumferential direction change as shown in FIG. 17A.
Figure 17C:
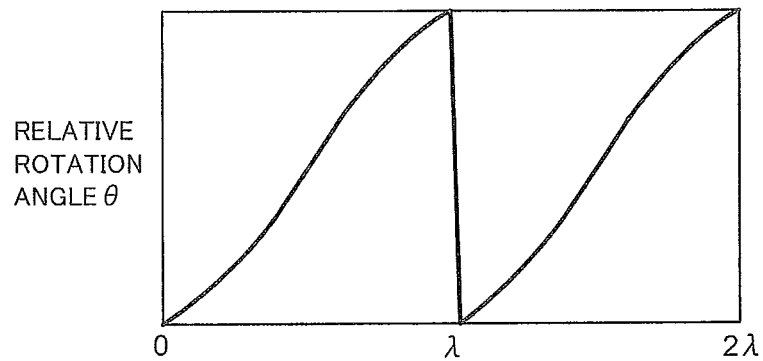
FIG. 17C shows a computational result of the relative rotation angle between the first rotary shaft and the second rotary shaft in the case where the output values are obtained as shown in FIG. 17B.

FIG. 17A is a graph showing the magnetic field component Br in the radial direction and the magnetic field component B$\theta$ in the circumferential direction for twice the magnetization pitch $\lambda$, and this figure illustrates a case in which the amplitudes thereof are different from each other, as an example. FIG. 17B is a graph showing the output values Vout A and Vout B from the relative angle sensor 71 in the case where the magnetic field component Br in the radial direction and the magnetic field component B0 in the circumferential direction change as shown in FIG. 17A. FIG. 17C shows a computational result of the relative rotation angle θ between the first rotary shaft 120 and the second rotary shaft 130 in the case where the output values Vout A and Vout B are obtained as shown in FIG. 17B.

As shown in FIG. 17A, in the case where the amplitude of the magnetic field component Br in the radial direction shown as a cosine curve and the amplitude of the magnetic field component Bθ in the circumferential direction shown as a sine curve are different from each other, shapes of curves of the output values Vout A and Vout B from the relative angle sensor 71 are distorted as shown in FIG. 17B. That is, the output values Vout A and Vout B from the relative angle sensor 71 are displaced from the output values Vout A and Vout B in the case where the amplitude of the magnetic field component Br in the radial direction and the amplitude of the magnetic field component Bθ in the circumferential direction are equal to each other.

As a result, the computational result of the relative rotation angle θ between the first rotary shaft 120 and the second rotary shaft 130 (θ=arctan(Vout B/Vout A)) shows a curve shown in FIG. 17C, and the curve is different from a straight line as a result of the computation based on the output values Vout A and Vout B in the case where the amplitude of the magnetic field component Br in the radial direction and the amplitude of the magnetic field component Bθ in the circumferential direction are equal to each other. Accordingly, there is a possibility that sensing error occurs in the case where the amplitude of the magnetic field component Br in the radial direction and the amplitude of the magnetic field component Bθ in the circumferential direction are different from each other.

On this subject, the inventors were dedicated to conducting the study, and consequently, they found that distortion having a phase opposite to that of the distortion of the computational result due to amplitude difference between the magnetic field component Br in the radial direction and the magnetic field component Bθ in the circumferential direction can be generated by offsetting any one output value out of the output values Vout A and Vout B from the relative angle sensor 71 and by conducting computation with the offset value, and thereby the sensing error of the computational result can be suppressed.

More specifically, the sensing device 1 has a correction part 300 (refer to FIG. 2-2) that corrects one output value out of the output values Vout A and Vout B from the relative angle sensor 71 by adding a predetermined value described later to the one output value or subtracting the predetermined value from the one output value. The relative angle computing part 210 computes the relative rotation angle θ between the first rotary shaft 120 and the second rotary shaft 130 on the basis of the one output value after the addition or the subtraction outputted from the correction part 300 and the other output value outputted from the relative angle sensor 71. It should be noted that, in FIG. 2-2, configuration in which the correction part 300 corrects the output value Vout A from the relative angle sensor 71 is exemplified.

Figure 18A:
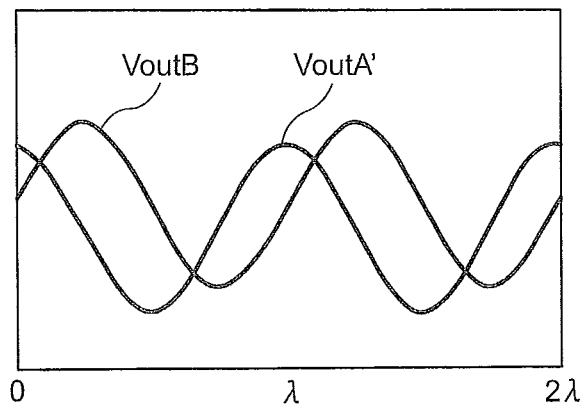
FIG. 18A is a graph showing a value outputted from the correction unit and the output value from the relative angle sensor in the case where the amplitude of the magnetic field component in the radial direction and the magnetic field component in the circumferential direction are equal to each other.
Figure 18B:
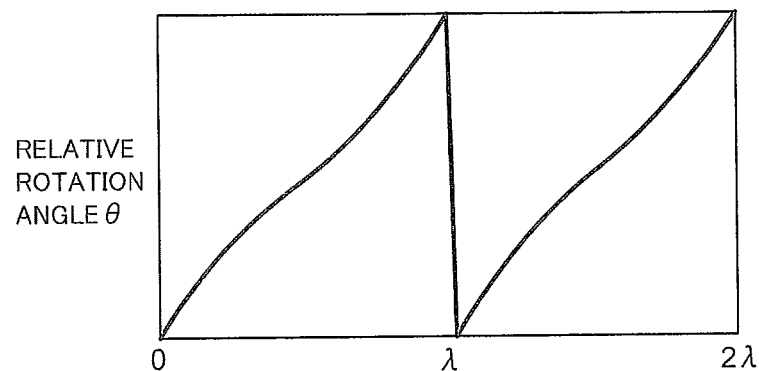
FIG. 18B shows a computational result of the relative rotation angle between the first rotary shaft and the second rotary shaft in the case where the output values are obtained as shown in FIG. 18A.

FIG. 18A is a graph showing a value Vout A' outputted from the correction part 300 after the subtraction and Vout B as the output value from the relative angle sensor 71 in the case where the amplitude of the magnetic field component Br in the radial direction and the magnetic field component Bθ in the circumferential direction are equal to each other. FIG. 18B shows a computational result of the relative rotation angle θ between the first rotary shaft 120 and the second rotary shaft 130 in the case where the output values Vout A' and Vout B are obtained as shown in FIG. 18A.

FIG. 18A shows Vout A' as a value which has been obtained by subtracting the predetermined value from Vout A as the output value from the relative angle sensor 71 in the correction part 300, and the output value Vout B from the relative angle sensor 71, which is not corrected in the correction part 300, in the case where the amplitude of the magnetic field component Br in the radial direction and the amplitude of the magnetic field component Bθ in the circumferential direction are equal to each other.

The relative rotation angle θ (θ=arctan(Vout B/Vout A')) between the first rotary shaft 120 and the second rotary shaft 130, which has been obtained by computation of the relative angle computing part 210 based on the output value Vout A' from the correction part 300 and the output value Vout B from the relative angle sensor 71 becomes a curve shown in FIG. 18B. When the curve shown in FIG. 18B is viewed, it is found that distortion having the phase opposite to that of the curve shown in FIG. 17C is generated.

Figure 19A:
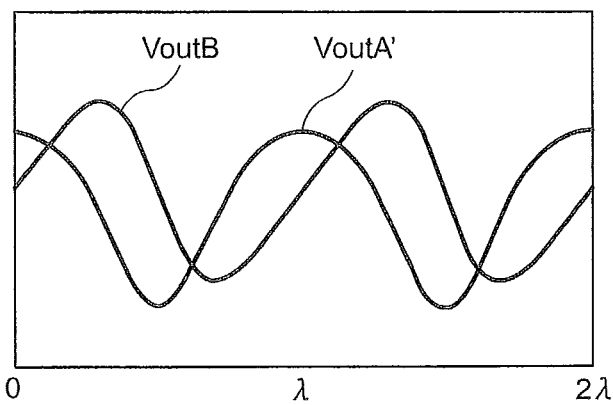
FIG. 19A is a graph showing a value outputted from the correction unit and the output value from the relative angle sensor in the case where the amplitude of the magnetic field component in the radial direction and the amplitude of the magnetic field component in the circumferential direction are different from each other.
Figure 19B:
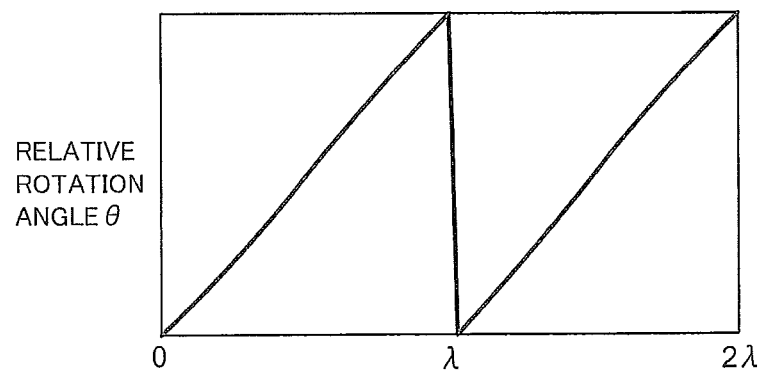
FIG. 19B shows a computational result of the relative rotation angle between the first rotary shaft and the second rotary shaft in the case where the output values are obtained as shown in FIG. 19A.

FIG. 19A is a graph showing Vout A' as a value outputted from the correction part 300 after the subtraction and Vout B as the output value from the relative angle sensor 71 in the case where the amplitude of the magnetic field component Br in the radial direction and the amplitude of the magnetic field component Bθ in the circumferential direction are different from each other. FIG. 19B shows a computational result of the relative rotation angle θ between the first rotary shaft 120 and the second rotary shaft 130 in the case where the output values Vout A' and Vout B are obtained as shown in FIG. 19A.

Next, FIG. 19A shows Vout A' as a value obtained by subtracting the predetermined value from the Vout A as the output value from the relative angle sensor 71 in the correction part 300, and the output value Vout B from the relative angle sensor 71, which is not corrected in the correction part 300, in the case where the amplitude of the magnetic field component Br in the radial direction and the amplitude of the magnetic field component Bθ in the circumferential direction are different from each other.

The relative rotation angle θ (θ=arctan(Vout B/Vout A')) between the first rotary shaft 120 and the second rotary shaft 130, which has been obtained by computation of the relative angle computing part 210 based on the output value Vout A' from the correction part 300 and the output value Vout B from the relative angle sensor 71 becomes a line shown in FIG. 19B. When FIG. 19B is viewed, it is found that a line connecting the computed relative rotation angles θ is approximately a straight line.

From the above, by the correction in which the predetermined value is subtracted from the output value Vout A from the relative angle sensor 71, that is, by offsetting the output value Vout A from the relative angle sensor 71 in a minus direction, it is found that the distortion of the computed relative rotation angle θ due to the amplitude difference between the magnetic field component Br in the radial direction and the magnetic field component Bθ in the circumferential direction is cancelled, and the sensing error of the relative rotation angle θ can be suppressed.

It should be noted that, in the aforementioned specific example described with FIGS. 18A, 18B, 19A and 19B, a configuration in which the distortion of the relative rotation angle θ due to the amplitude difference between the magnetic field component Br in the radial direction and the magnetic field component Bθ in the circumferential direction is cancelled by offsetting the output value Vout A from the relative angle sensor 71 has been described. However, the output value Vout B from the relative angle sensor 71 may be offset. In such a case, the correction part 300 corrects the output value Vout B from the relative angle sensor 71. Then, in the correction part 300, the predetermined value is preferably added to the output value Vout B from the relative angle sensor 71 so that the relative relationship between the Vout B' corrected in the correction part 300 and the output value Vout A from the relative angle sensor 71 becomes the relative relationship shown in FIG. 19A.

Next, description will be given for the direction and the amount of the offset of any one output value out of the output values Vout A and Vout B from the relative angle sensor 71 by the correction part 300, that is, the addition to the one output value or subtraction from the one output value, and the predetermined value for the addition or the subtraction.

Figure 20:
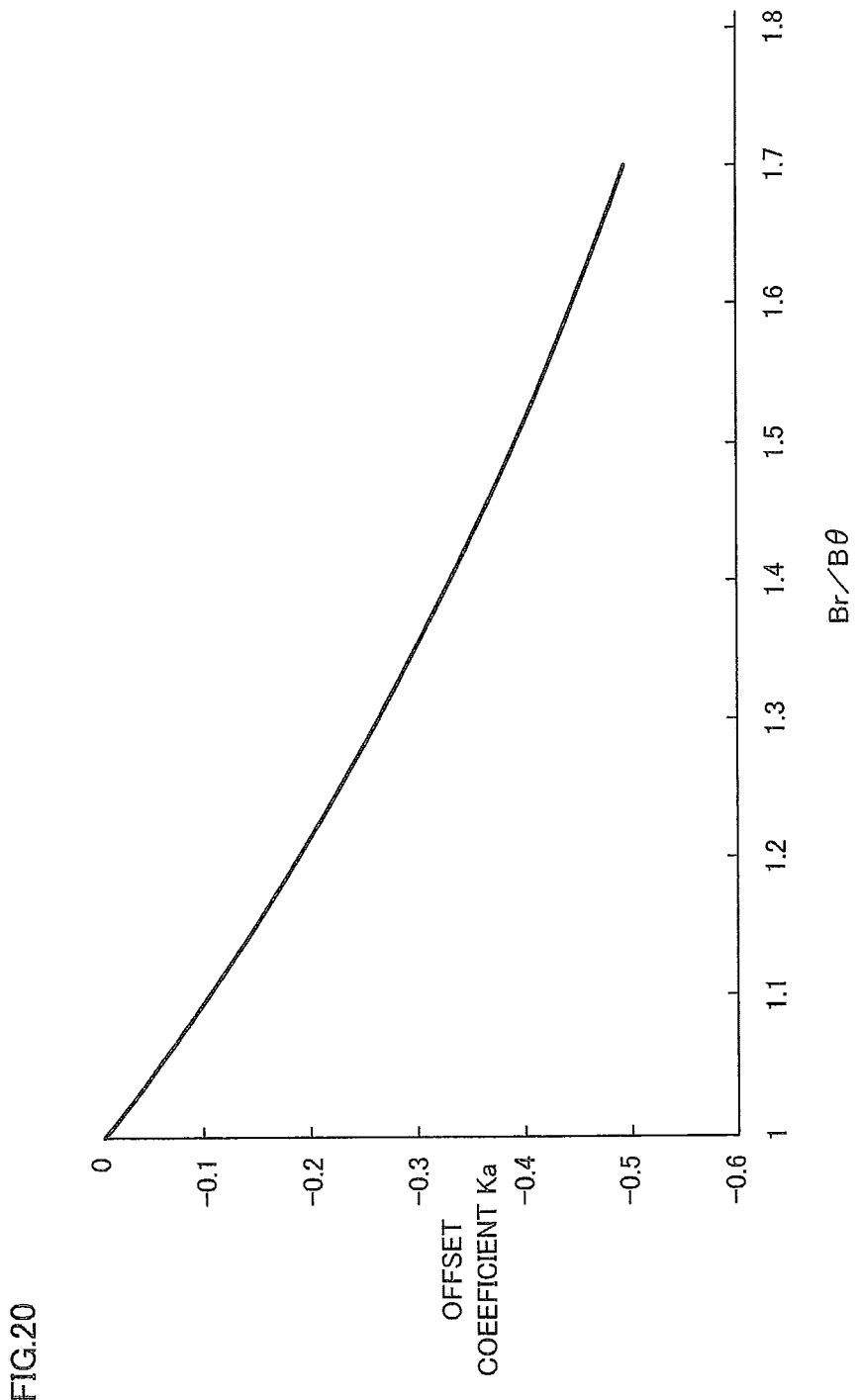
FIG. 20 is a graph showing a relationship between an amplitude ratio between the amplitude of the magnetic field component in the radial direction and the amplitude of the magnetic field component in the circumferential direction and an offset coefficient.

FIG. 20 is a graph showing a relationship between an amplitude ratio between the amplitude of the magnetic field component Br in the radial direction and the amplitude of the magnetic field component Bθ in the circumferential direction and an offset coefficient Ka.

The amplitude of the output value Vout A from the relative angle sensor 71 is set as Ca, the offset value thereof is set as Da, the amplitude of the output value Vout B is set as Cb, and the offset value thereof is set as Db. The amplitudes Ca and Cb are determined by the characteristics of the relative angle sensor 71. Since the difference between Ca and Cb is very few, Ca=Cb=C is set, the offset coefficient Ka in the case where the output value Vout A from the relative angle sensor 71 is offset is set as Da/C, and the offset coefficient Kb in the case where the output value Vout B is offset is set as Db/C. The relationship between the amplitude ratio Br/Bθ and the offset coefficient Ka or Kb, which is shown in FIG. 20, has been derived in advance (FIG. 20 shows a relationship between the amplitude ratio Br/Bθ and the offset coefficient Ka as an example), and the offset coefficient Ka or Kb is determined on the basis of the relationship and the amplitude ratio Br/Bθ. Thereafter, the offset value Da or Db is determined by the determined offset coefficient Ka or Kb and the amplitude C. As described above, the offset value is determined in accordance with the amplitude ratio Br/Bθ and the amplitude of the output value Vout A or Vout B which is to be offset. The sign of the offset value Da or Db indicates the direction for offset, and the absolute value of the offset value Da or Db is the predetermined value which should be offset in the direction.

For example, in the case where the amplitude ratio Br/Bθ is 1.2, the offset coefficient Ka is determined as −0.2 from FIG. 20. Then, the offset value Da is determined as Ka×Ca=−0.2×Ca.

In the case where they are determined as described above, the correction part 300 is to offset the output value Vout A from the relative angle sensor 71 by 20% of the amplitude Ca in the minus direction, and output the offset value. In other words, by the correction part 300, 20% of the amplitude Ca is to be subtracted from the output value Vout A from the relative angle sensor 71 and the value after the subtraction is to be outputted.

It should be noted that the amplitude Ca is determined by the characteristics of the relative angle sensor 71 as mentioned above, and since it can be recognized at the design phase, the specific value of the offset value Da can be calculated at the design phase, too.

Moreover, for example, in the case where the amplitude ratio Br/Bθ is 1.2, the offset coefficient Kb may be determined as 0.2 and the offset value Db may be determined as Kb×Cb=0.2×Cb in accordance with the predetermined relationship between the amplitude ratio Br/Bθ and the offset coefficient Kb.

In the case where they are determined as described above, the correction part 300 is to offset the output value Vout B from the relative angle sensor 71 by 20% of the amplitude Cb in the plus direction, and output the offset value. In other words, by the correction part 300, 20% of the amplitude Cb is to be added to the output value Vout B from the relative angle sensor 71 and the value after the addition is to be outputted.

The amplitude Cb is also determined by the characteristics of the relative angle sensor 71 as mentioned above, and since it can be recognized at the design phase, the specific value of the offset value Db can be calculated at the design phase, too.

It should be noted that the direction and amount of the offset, that is, the subtraction from any one output value out of the output values Vout A and Vout B from the relative angle sensor 71 or the addition to any one output value out of the output values Vout A and Vout B, and the determination of the value for the subtraction or the addition can be determined at the following phase as an example.

That is, the value is determined at a phase before a vehicle is used by a user after the sensing device 1 is mounted on the vehicle, and preferably at the adjustment phase in an inspection process after the sensing device 1 is mounted on the vehicle. For the determination, first, the amplitude of the magnetic field component Br in the radial direction and the amplitude of the magnetic field component Bθ in the circumferential direction in the magnetically sensitive surface of the relative angle sensor 71 are measured. Then, from the amplitude ratio Br/Bθ, the relationship shown in FIG. 20 and the like, any one of the offset coefficient Ka and Kb of the output values Vout A and Vout B from the relative angle sensor 71 is determined. Thereafter, from the offset coefficient Ka or Kb and the amplitude C of the output values Vout A and Vout B determined by the characteristics of the relative angle sensor 71, the direction and the amount of the offset are determined.

Alternatively, since the characteristics of the first magnet 10 and the relative angle sensor 71 to be used and the relative arrangement position between the first magnet 10 and the relative angle sensor 71 are determined at the design phase, which one of the output values Vout A and Vout B is offset, and the direction and the amount of the offset may be determined at the design phase.

Figure 21:
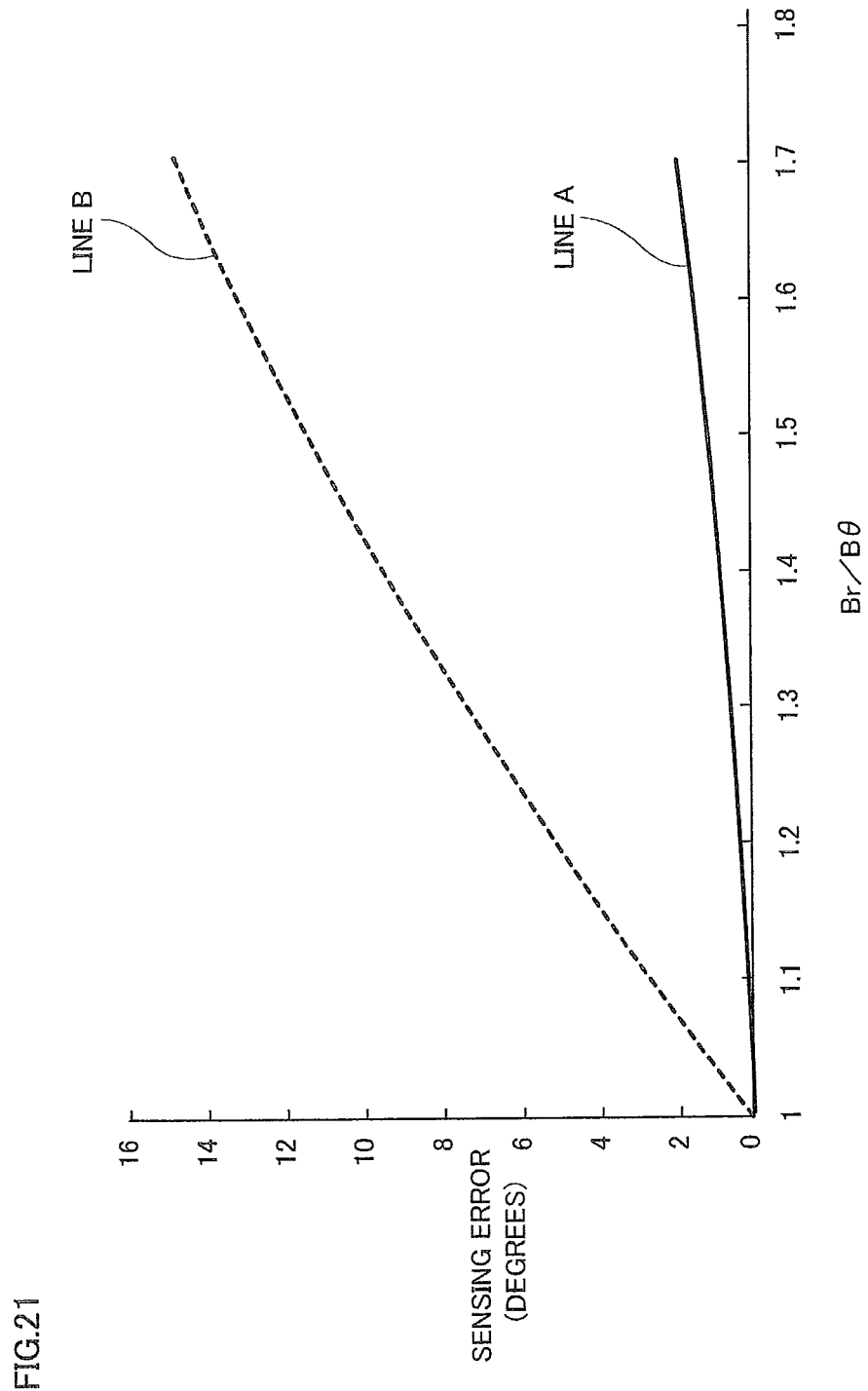
FIG. 21 is a graph showing a relationship between the amplitude ratio between the amplitude of the magnetic field component in the radial direction and the amplitude of the magnetic field component in the circumferential direction and the sensing error.

FIG. 21 is a graph showing a relationship between the amplitude ratio Br/Bθ between the amplitude of the magnetic field component Br in the radial direction and the amplitude of the magnetic field component Bθ in the circumferential direction and the sensing error.

In FIG. 21, the sensing error of the relative rotation angle θ by the sensing device 1 in the case where the computation with the value obtained by correcting (offsetting) any one output value out of the output values Vout A and Vout B from the relative angle sensor 71 is conducted in the correction part 300 is shown as a line A which is shown as a solid line, and the sensing error of the relative rotation angle θ by the sensing device 1 in the case where the computation is conducted with no correction (offset) in the correction part 300 by using the output values Vout A and Vout B from the relative angle sensor 71 as they are is shown as a line B which is shown as a broken line.

The line A in FIG. 21 shows the sensing error of the relative rotation angle θ by the sensing device 1 in the case where computation is conducted by using the value obtained by correcting, in the correction part 300, the output value Vout A from the relative angle sensor 71 by an amount determined by using the offset coefficient Ka derived from the relationship between the amplitude ratio Br/Bθ and the offset coefficient Ka shown in FIG. 20. The line showing the relationship between the amplitude ratio Br/Bθ and the offset coefficient Ka in FIG. 20 is a line showing an ideal relationship therebetween. It is the line A in FIG. 21 that shows the sensing error in the case where the correction is made by the offset value Da determined by using the offset coefficient Ka determined on the basis of the ideal relationship, and the relative rotation angle θ is computed on the basis of the corrected value. That is, the correction by the correction part 300 is based on the offset value Da determined by using the offset coefficient Ka determined on the basis of the ideal relationship, and thereby difference of the sensing error between the line A and the line B in FIG. 21 can be suppressed.

In other words, the sensing error in the case where the correction is not made is shown as the line B in FIG. 21, and the sensing error is smaller than the value of the line B as the amount of the offset is increased to the absolute value of the offset value Da determined by using the offset coefficient Ka determined on the basis of the ideal relationship. That is, by conducting the offset in the offset direction determined by the offset coefficient Ka determined on the basis of the ideal relationship in the correction part 300 even if the value of the offset is small, the sensing error can be smaller than that in the case where no offset is conducted.

Moreover, if the amount of the offset is increased beyond the absolute value of the offset value Da determined by using the offset coefficient Ka determined on the basis of the ideal relationship, in fact the sensing error is larger than the value of the line A. If the amount of the offset is too large, in fact the sensing error is larger than that in the case where no offset is conducted, that is, the value of the line B. That is, in the case where the amount of the offset which causes the sensing error to be larger than that in the case where no offset is conducted is set as an acceptable limit, the sensing error in the case where the offset is conducted is smaller than that in the case where no offset is conducted if the amount of the offset is larger than the absolute value of the offset value Da determined by using the offset coefficient Ka determined on the basis of the ideal relationship but is less than the acceptable limit. If the offset coefficient Ka at which the amount of the offset is equal to the acceptable limit is set as an acceptable limit of the offset coefficient Kamax, the acceptable limit of the offset coefficient Kamax is determined in accordance with the amplitude ratio Br/Bθ. For example, in the case where the amplitude ratio Br/Bθ is 1.05, the acceptable limit of the offset coefficient Kamax is −0.1, and, in the case where the amplitude ratio Br/Bθ is 1.65, the acceptable limit of the offset coefficient Kamax is −0.74. If the amplitude ratio Br/Bθ is in the range more than 1.05 and less than 1.65, the acceptable limit of the offset coefficient Kamax becomes a value according to the amplitude ratio Br/Bθ similarly to the ideal relationship between the amplitude ratio Br/Bθ and the offset coefficient Ka, and becomes a value less than −0.1 and more than −0.74.

It should be noted that, as a reference, in order to make the sensing error much smaller than the sensing error in the case where no offset is conducted, the offset coefficient Ka is preferably set to be in the range of −0.07 to −0.02 in the case where the amplitude ratio Br/Bθ is 1.05, and in the range of −0.61 to −0.25 in the case where the amplitude ratio Br/Bθ is 1.65, for example. Further, in the range where the amplitude ratio Br/Bθ is more than 1.05 and less than 1.65, it is preferable that the offset coefficient Ka is a value within a region enclosed by a curve line passing through −0.02 and −0.25, which is similar to the curve line of the ideal relationship between the amplitude ratio Br/Bθ and the offset coefficient Ka and a curve line passing through −0.07 and −0.61, which is similar to the curve line of the ideal relationship.

It should be noted that the aforementioned correction part 300 can be configured with not only hardware but also software. For example, a product such as a sensor IC in which an MR sensor (magnetoresistive element) and an arithmetic element are configured as one package is used. In such a case, the arithmetic element functions as the correction part 300. The sensor IC having this one package may have a function for offsetting an output of the MR sensor (magnetoresistive element) in order to calibrate the MR sensor (magnetoresistive element), and in such a product, it is possible to prevent rising cost for providing the correction part 300, by using this function. Further, in the case where the sensor IC in which the MR sensor and the arithmetic element are configured as one package is used, which one of the output values Vout A and Vout B is to be offset, and the direction and the amount of the offset, which have been determined at, for example, the design phase or the adjustment phase in the inspection process, are set in the arithmetic element functioning as the correction part 300, and the sensor IC after the setting may be mounted on a vehicle. In such a case, the relative angle computing part 210 computes the relative rotation angle θ between the first rotary shaft 120 and the second rotary shaft 130 on the basis of the one output value after the addition or the subtraction and the other output value with no addition or no subtraction outputted from the sensor IC.

Alternatively, the correction part 300 may be provided to the printed substrate where the relative angle computing part 210 is arranged. For example, in the case where the ECU 200 functions as the relative angle computing part 210, the ECU 200 may function as the correction part 300. In FIG. 2-2, a configuration in which the ECU 200 also functions as the correction part 300 is illustrated as an example. In such a case, which one of the output values Vout A and Vout B is to be offset, and the direction and the amount of the offset are determined at, for example, the design phase or the arrangement phase in the inspection process. Then, in the ROM 202 of the ECU 200, a computing program in which the predetermined value is added to any one output value out of the output values Vout A and Vout B from the relative angle sensor 71 or the predetermined value is subtracted from the one output value to correct the one output value is memorized. After the ECU 200 is mounted on a vehicle, the CPU 201 corrects any one output value out of the output values Vout A and Vout B from the relative angle sensor 71 by this computing program. Thereafter, the relative angle computing part 210 computes the relative rotation angle θ between the first rotary shaft 120 and the second rotary shaft 130 on the basis of the one output value after the addition or the subtraction and the other output value outputted from the relative angle sensor 71 as it is, which have been outputted.

As described above, it is possible for the sensing device 1 according to the exemplary embodiment to sense the relative rotation angle θ between the first rotary shaft 120 and the second rotary shaft 130 with high accuracy even if the relative position between the first magnet 10 and the relative angle sensor 71 is the position where the magnitudes of the amplitudes of the magnetic field components orthogonal to each other in the magnetically sensitive surface of the relative angle sensor 71 are different from each other. Accordingly, it is not necessary to make the amplitudes of the magnetic field components orthogonal to each other in the magnetically sensitive surface of the relative angle sensor 71 correspond to each other. Thus, the relative position between the first magnet 10 and the relative angle sensor 71 can be freely set, and thereby it is possible to increase flexibility of the layout, and to downsize the device since the layout in which the relative angle sensor 71 is positioned near the first magnet 10 can be accepted. In addition, for mounting the sensing device 1 on a vehicle, it is not necessary to conduct positioning with high accuracy, and thereby it is possible to increase the production efficiency. Also, since the relative rotation angle θ can be sensed with high accuracy without arranging the relative angle sensor 71 in the shaft center direction of the first rotary shaft 120, it is possible to increase flexibility of the layout and realize downsizing of the device.

The aforementioned relative angle detection method in which the output value from the relative angle sensor 71 is offset and the offset value is used for the computation of the relative rotation angle θ is usable independently of the characteristics of the first magnet 10. Accordingly, if the shape, material and the like of the first magnet 10 are changed, it is not necessary to change other components. Therefore, it is possible to suppress specification change of other components in association with the specification change of the first magnet 10 according to a type of a vehicle.

Moreover, since it is possible for the sensing device 1 according to the exemplary embodiment to conduct sensing with high accuracy independently of the magnetic field of the first magnet 10, an expensive magnet that forms a magnetic field having less variability may not be used as the first magnet 10. Namely, sensing with high accuracy is achieved even if an inexpensive magnet is used as the first magnet 10, and thus it is possible to realize the device with low cost.

Moreover, the aforementioned relative angle detection method in which any one of the two output values from the relative angle sensor 71 is offset and the offset value is used for the computation of the relative rotation angle θ is applied to the sensing device 1 according to the exemplary embodiment to conduct high sensing of the relative rotation angle between the first rotary shaft 120 and the second rotary shaft 130 with high accuracy. However, it will be obvious that this method can be applied to, for example, a rotation angle sensing device that senses a rotation angle of a rotating body rotatably supported by a housing.

That is, the first magnet 10 is mounted on the first rotary shaft 120 as an example of a rotating body, and the relative angle sensor 71 as an example of the first magnetic field sensing unit and the second magnetic field sensing unit is mounted on the housing 110. Then, any one output value out of the two output values from the relative angle sensor 71 is offset, the offset value is used for the computation of the rotation angle of the first rotary shaft 120, and thereby it is possible to sense the rotation angle of the first rotary shaft 120 with high accuracy.

Moreover, the aforementioned description has been given for the case where the relative angle detection method in which any one of the two output values is offset and the offset value is used for the computation of the relative rotation angle θ is applied to the sensing device 1 having the relative angle sensor 71 that outputs the two output values Vout A and Vout B by itself. However, it is obvious that this method can be applied to a device having two MR sensors respectively output the output values Vout A and Vout B having different phases. In such a case, any one of the two MR sensors functions as an example of the first magnetic field sensing unit and the other one of the two MR sensors functions as an example of the second magnetic field sensing unit.

<Second Exemplary Embodiment>

In the sensing device 1 according to the aforementioned first exemplary embodiment, the configuration in which the direction and the amount of the offset determined for correcting any one of the output values Vout A and Vout B from the relative angle sensor 71 by the correction part 300 are fixed has been mentioned. However, the direction and the amount of the offset may be changed according to the situation. The sensing device 1 according to the second exemplary embodiment is characterized in that the direction and the amount of the offset are changed according to the situation. Hereinafter, difference from the first exemplary embodiment will be described, and the same constitutional components are denoted by the same reference numerals and the detailed description thereof will be omitted.

Figure 22:
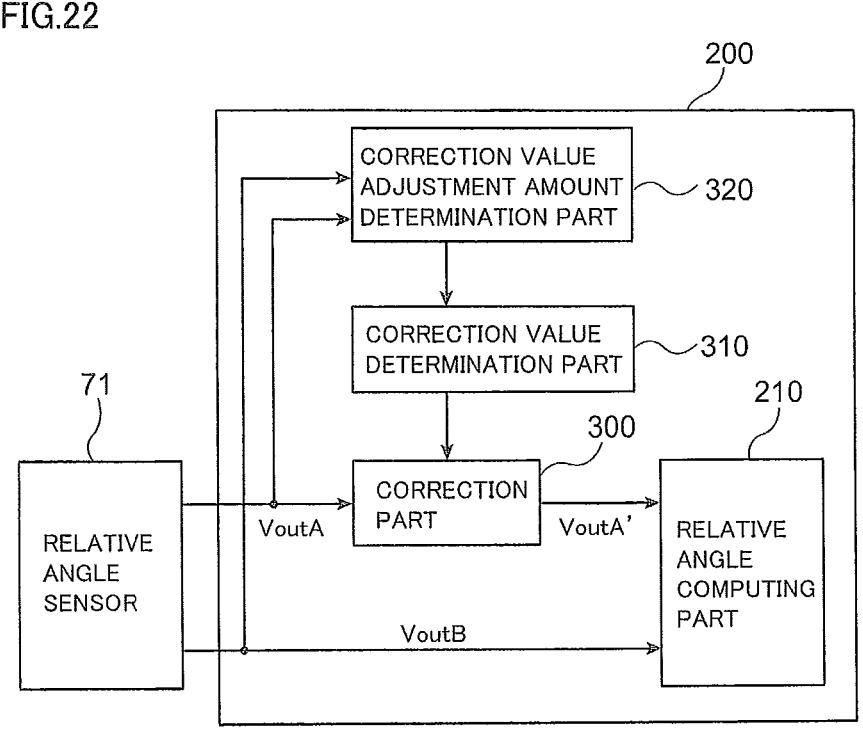
FIG. 22 is a diagram illustrating a schematic configuration of the sensing device 1 according to the second exemplary embodiment.

FIG. 22 is a diagram illustrating a schematic configuration of the sensing device 1 according to the second exemplary embodiment.

The ECU 200 is provided with: the correction part 300 that corrects any one output value out of the output values Vout A and Vout B from the relative angle sensor 71; and the relative angle computing part 210 that computes the relative rotation angle θ between the first rotary shaft 120 and the second rotary shaft 130 on the basis of the one output value after the correction in the correction part 300 and the other output value with no correction in the correction part 300. In the exemplary embodiment, which one of the output values Vout A and Vout B from the relative angle sensor 71 is to be offset is determined at the design phase or the arrangement phase in the inspection process, and the correction value determining the direction and the amount of the offset is changed according to change of the environment where the relative angle sensor 71 is placed. In FIG. 22, a configuration in which the correction part 300 corrects the output value Vout A from the relative angle sensor 71 is illustrated as an example.

Further, the ECU 200 is provided with: a correction value determination part 310 that determines the correction value used for correction by the correction part 300; and a correction value adjustment amount determination part 320 that determines the adjustment amount of the correction value used at the determination of the correction value by the correction value determination part 310. The adjustment amount of the correction value takes a role for adjusting the correction value used for correction by the correction part 300 in accordance with the change of the environment where the relative angle sensor 71 is placed.

Also in the sensing device 1 according to the second exemplary embodiment, similarly to the sensing device 1 according to the first exemplary embodiment, the offset coefficient Ka or Kb is set. That is, the amplitude of the output value Vout A from the relative angle sensor 71 is set as Ca, and the offset value thereof is set as Da, and the amplitude of the output value Vout B is set as Cb, and the offset value thereof is set as Db. The amplitudes Ca and Cb are determined by the characteristics of the relative angle sensor 71. Since the difference between Ca and Cb is very few, Ca=Cb=C is set, the offset coefficient Ka in the case where the output value Vout A from the relative angle sensor 71 is offset is set as Da/C, and the offset coefficient Kb in the case where the output value Vout B is offset is set as Db/C. The relationship between the amplitude ratio Br/Bθ and the offset coefficient Ka, which is shown in FIG. 20, or the relationship between the amplitude ratio Br/Bθ and the offset coefficient Kb, is derived in advance, and the offset coefficient Ka or Kb is determined on the basis of the relationship and the amplitude ratio Br/Bθ. However, since the first magnet 10 to be used, the characteristics of the relative angle sensor 71 and the relative arrangement position between the first magnet 10 and the relative angle sensor 71 are determined at the design phase or the adjustment phase in the inspection process, which one of the output values Vout A and the B out B is to be offset and the offset coefficient Ka or Kb for the output value to be offset are determined at the design phase or the adjustment phase in the inspection process. Then, the determined offset coefficient Ka or Kb is memorized in the ROM 202.

Next, description will be given for the correction value determination part 310 and the correction value adjustment amount determination part 320.

Hereinafter, first, description will be given for the case where the output value Vout A has been determined to be offset at the design phase or the adjustment phase in the inspection process, and the offset coefficient Ka has been determined.

As mentioned above, since Ka=Da/C is satisfied, Da=C× Ka is satisfied. That is, the offset value Da becomes a value according to the amplitude C of the output values Vout A and Vout B from the relative angle sensor 71, and the offset coefficient Ka. Further, since the offset coefficient Ka has been determined at the design phase or the adjustment phase in the inspection process and memorized in the ROM 202, the offset value Da changes according to the amplitude C at a phase after the sensing device 1 is incorporated.

Here, although the amplitude C is determined by the characteristics of the relative angle sensor 71 as mentioned above, the amplitude C changes in accordance with temperature change of the environment where the relative angle sensor 71 is placed, due to the characteristics of the relative angle sensor 71. Thus, the offset value Da changes in accordance with the temperature of the environment where the relative angle sensor 71 is placed.

On the other hand, the output values Vout A and Vout B from the relative angle sensor 71 are a cosine curve (cosine wave) and a sine curve (sine wave) having phase difference by a quarter cycle, respectively. In addition, the amplitudes of these output values are approximately the same amplitude C. Therefore, even if the first magnet 10 relatively rotates with respect to the relative angle sensor 71, a value of Vout $A^2$+Vout $B^2$ is always constant, and Vout $A^2$+Vout $B^2=C^2$ is satisfied. Thereby, since C=(Vout $A^2$+Vout $B^2)^{1/2}$ is satisfied, it is possible to calculate the amplitude C on the basis of the output values Vout A and Vout B from the relative angle sensor 71. That is, by C=(Vout $A^2$+Vout $B^2)^{1/2}$, it is possible to calculate the amplitude C changing in accordance with the temperature of the relative angle sensor 71.

From the above, the correction value adjustment amount determination part 320 calculates the amplitude C as an example of a correction value adjustment amount on the basis of the output values Vout A and Vout B from the relative angle sensor 71. Further, the correction value determination part 310 multiplies the amplitude C calculated by the correction value adjustment amount determination part 320 and the offset coefficient Ka memorized in the ROM 202 in advance, and thereby calculates the offset value Da as an example of a correction value. Then, the calculated offset value Da is outputted to the correction part 300.

Thereafter, the correction part 300 outputs Vout A' as a value obtained by adding the offset value Da calculated by the correction value determination part 310 to the output value Vout A from the relative angle sensor 71. As shown in FIG. 20, in the case where the offset coefficient Ka is a minus value, the correction part 300 offsets the output value Vout A from the relative angle sensor 71 in the minus direction by the absolute value of the offset value Da, and outputs the offset value. In other words, by the correction part 300, the absolute value of the offset value Da is subtracted from the output value Vout A from the relative angle sensor 71, and the value after the subtraction is outputted as Vout A' by the correction part 300.

Then, the relative angle computing part 210 computes the relative rotation angle θ between the first rotary shaft 120 and the second rotary shaft 130 on the basis of the output value Vout A' from the correction part 300 and the output value Vout B from the relative angle sensor 71 (θ=arctan (Vout B/Vout A')).

In the aforementioned sensing device 1 according to the second exemplary embodiment, since the correction value according to the change of the environment where the relative angle sensor 71 is placed is determined, one output value out of the output values Vout A and Vout B from the relative angle sensor 71 is corrected on the basis of the correction value, and the relative rotation angle θ is computed on the basis of the one output value after the correction, it is possible to compute the relative rotation angle θ with high accuracy.

Reference Signs List

1 ... Sensing device
10 ... First magnet
20 ... First gear wheel
30 ... Second gear wheel
40 ... Third gear wheel
50 ... Flat cable cover
60 ... Base
70 ... Printed substrate
71 ... Relative angle sensor
72 ... First rotation angle sensor
73 ... Second rotation angle sensor
80 ... Flat cable
100 ... Electric power steering apparatus
110 ... Housing
120 ... First rotary shaft
130 ... Second rotary shaft
140 ... Torsion bar
150 ... Worm wheel
160 ... Electric motor
200 ... Electronic control unit (ECU)
210 ... Relative angle computing part
220 ... Rotation angle computing part
300 ... Correction part

The invention claimed is:

1. A relative angle detection device that detects a relative angle between a first rotary shaft and a second rotary shaft, the relative angle detection device comprising:
   a magnet that is provided to any one rotary shaft out of the first rotary shaft and the second rotary shaft;
   a first magnetic field sensing unit that is provided to the other rotary shaft different from the one rotary shaft, and outputs a value according to a magnetic field of the magnet;
   a second magnetic field sensing unit that is provided to the other rotary shaft, outputs a value according to a magnetic field of the magnet, and outputs a value different from an output value of the first magnetic field sensing unit even if being placed in a magnetic field equal to a magnetic field of the first magnetic field sensing unit;
   a correction unit that corrects any one output value out of the output value of the first magnetic field sensing unit and an output value of the second magnetic field sensing unit in accordance with an amplitude ratio between magnetic field components orthogonal to each other in the magnetic field of the magnet; and
   a computing unit that computes a relative angle between the first rotary shaft and the second rotary shaft on the basis of the one output value having been corrected by the correction unit and the other output value different from the one output value.

2. The relative angle detection device according to claim 1, wherein the correction unit makes a correction with a predetermined value in accordance with the amplitude ratio between the magnetic field components.

3. The relative angle detection device according to claim 2, wherein the predetermined value or the correction value is a value according to an amplitude ratio between amplitude of a magnetic field component in a direction of a rotation radius of the first rotary shaft and amplitude of a magnetic field component in a circumferential direction of the first rotary shaft.

4. The relative angle detection device according to claim 1, further comprising a determination unit that determines a correction value according to the amplitude ratio between the magnetic field components, wherein
the correction unit corrects the one output value with the correction value determined by the determination unit.

5. The relative angle detection device according to claim 4, wherein the determination unit determines the correction value also in accordance with change of an environment where the first magnetic field sensing unit or the second magnetic field sensing unit is placed.

6. The relative angle detection device according to claim 4, wherein the determination unit determines the correction value on the basis of the output value of the first magnetic field sensing unit and the output value of the second magnetic field sensing unit.

7. A rotation angle detection device that detects a rotation angle of a rotating body rotatably supported by a housing, the rotation angle detection device comprising:
a magnet that is provided to one component out of the rotating body and the housing;
a first magnetic field sensing unit that is provided to the other component out of the rotating body and the housing, different from the one component, and outputs a value according to a magnetic field of the magnet;
a second magnetic field sensing unit that is provided to the other component, outputs a value according to a magnetic field of the magnet, and outputs a value different from an output value of the first magnetic field sensing unit even if being placed at a magnetic field equal to a magnetic field of the first magnetic field sensing unit;
a correction unit that corrects any one output value out of the output value of the first magnetic field sensing unit and an output value of the second magnetic field sensing unit in accordance with an amplitude ratio between magnetic field components orthogonal to each other in the magnetic field of the magnet; and
a computing unit that computes a rotation angle of the rotating body on the basis of the one output value having been corrected by the correction unit and the other output value different from the one output value.

8. The rotation angle detection device according to claim 7, wherein the correction unit makes a correction with a predetermined value in accordance with the amplitude ratio between the magnetic field components.

9. The rotation angle detection device according to claim 8, wherein the predetermined value or the correction value is a value according to an amplitude ratio between amplitude of a magnetic field component in a direction of a rotation radius of the first rotary shaft and amplitude of a magnetic field component in a circumferential direction of the first rotary shaft.

10. The rotation angle detection device according to claim 7, further comprising a determination unit that determines a correction value according to the amplitude ratio between the magnetic field components, wherein
the correction unit corrects the one output value with the correction value determined by the determination unit.

11. The rotation angle detection device according to claim 10, wherein the determination unit determines the correction value also in accordance with change of an environment where the first magnetic field sensing unit or the second magnetic field sensing unit is placed.

12. The rotation angle detection device according to claim 10, wherein the determination unit determines the correction value on the basis of the output value of the first magnetic field sensing unit and the output value of the second magnetic field sensing unit.

13. A relative angle detection method of a relative angle detection device detecting a relative angle between a first rotary shaft and a second rotary shaft and including a magnet that is provided to any one rotary shaft out of the first rotary shaft and the second rotary shaft, a first magnetic field sensing unit that is provided to the other rotary shaft different from the one rotary shaft, and outputs a value according to a magnetic field of the magnet, and a second magnetic field sensing unit that is provided to the other rotary shaft, outputs a value according to a magnetic field of the magnet, and outputs a value different from an output value of the first magnetic field sensing unit even if being placed in a magnetic field equal to a magnetic field of the first magnetic field sensing unit, the relative angle detection method comprising:
correcting any one output value out of the output value of the first magnetic field sensing unit and an output value of the second magnetic field sensing unit in accordance with an amplitude ratio between magnetic field components orthogonal to each other in the magnetic field of the magnet; and
computing the relative angle between the first rotary shaft and the second rotary shaft on the basis of the one output value that has been corrected and the other output value different from the one output value.

14. A rotation angle detection method of a rotation angle detection device detecting a rotation angle of a rotating body rotatably supported by a housing, and including a magnet that is provided to one component out of the housing and the rotating body, a first magnetic field sensing unit that is provided to the other component out of the housing and the rotating body, different from the one component, and outputs a value according to a magnetic field of the magnet, and a second magnetic field sensing unit that is provided to the other component, outputs a value according to a magnetic field of the magnet, and outputs a value different from an output value of the first magnetic field sensing unit even if being placed at a magnetic field equal to a magnetic field of the first magnetic field sensing unit, the rotation angle detection method comprising:
correcting any one output value out of the output value of the first magnetic field sensing unit and the output value of the second magnetic field sensing unit in accordance with an amplitude ratio between magnetic field components orthogonal to each other in the magnetic field of the magnet; and
computing the rotation angle of the rotating body on the basis of the one output value that has been corrected and the other output value different from the one output value.

* * * * *

UNITED STATES PATENT AND TRADEMARK OFFICE
CERTIFICATE OF CORRECTION

PATENT NO. : 8,810,237 B2
APPLICATION NO. : 13/512555
DATED : August 19, 2014
INVENTOR(S) : Hiroyuki Muto, Kiyokazu Okado and Tsukasa Suzuki It is certified that error appears in the above-identified patent and that said Letters Patent is hereby corrected as shown below:

In the Claims,
Column 25, Line 1, "3." should be "6.".
Column 25, Line 7, "4." should be "3.".
Column 25, Line 13, "5." should be "4.".
Column 25, Line 13, "to claim 4" should be "to claim 3".
Column 25, Line 18, "6." should be "5.".
Column 25, Line 18, "to claim 4" should be "to claim 3".
Column 25, Line 52, "9." should be "12.".
Column 25, Line 58, "10." should be "9.".
Column 26, Line 3, "11." should be "10.".
Column 26, Lines 3-4, "to claim 10" should be "to claim 9".
Column 26, Line 8, "12." should be "11.".
Column 26, Lines 8-9, "to claim 10" should be "to claim 9".

Signed and Sealed this
Twenty-seventh Day of January, 2015

Michelle K. Lee
*Deputy Director of the United States Patent and Trademark Office*